(12) United States Patent
Fukuzawa et al.

(10) Patent No.: US 7,557,933 B2
(45) Date of Patent: Jul. 7, 2009

(54) MEASURING PROBE, SAMPLE SURFACE MEASURING APPARATUS AND SAMPLE SURFACE MEASURING METHOD

(75) Inventors: Kenji Fukuzawa, Nagoya (JP); Mitsuhiro Shikita, Nagoya (JP); Satoshi Terada, Nagoya (JP)

(73) Assignee: Japan Science and Technology Agency, Kawaguchi-shi, Saitama (JP)

( * ) Notice: Subject to any disclaimer, the term of this patent is extended or adjusted under 35 U.S.C. 154(b) by 0 days.

(21) Appl. No.: 12/279,331

(22) PCT Filed: Feb. 14, 2007

(86) PCT No.: PCT/JP2007/052626
§ 371 (c)(1),
(2), (4) Date: Aug. 13, 2008

(87) PCT Pub. No.: WO2007/094365
PCT Pub. Date: Aug. 23, 2007

(65) Prior Publication Data
US 2009/0027690 A1 Jan. 29, 2009

(30) Foreign Application Priority Data
Feb. 14, 2006 (JP) .............................. 2006-037030

(51) Int. Cl.
*G01B 11/30* (2006.01)
(52) U.S. Cl. ........................ 356/600; 356/601; 356/445; 33/559; 33/556; 33/558.01; 33/558.04
(58) Field of Classification Search ................. 356/600, 356/601, 445; 250/559.22; 33/300, 504, 33/572, 559, 556, 558.01, 558.04
See application file for complete search history.

(56) References Cited
U.S. PATENT DOCUMENTS
2008/0148588 A1* 6/2008 Yoshizumi et al. ............ 33/561

FOREIGN PATENT DOCUMENTS
JP    6294638    10/1994

(Continued)

OTHER PUBLICATIONS

"Independent detection of vertical and lateral forces with a sidewall-implanted dual-axis piezoresistive cantilever", B.W. Chui et al., Applied Physics Letters, vol. 72, No. 11, pp. 1388-1390.

(Continued)

*Primary Examiner*—Roy Punnoose
(74) *Attorney, Agent, or Firm*—Patterson & Sheridan, L.L.P.

(57) ABSTRACT

A measurement probe 1 for measuring a surface of sample S comprises a base section 10, a head section 30 having a probe tip 31, and a support structure section 15 which supports the head section 30 with the base section 10 along a support axis substantially orthogonal to the vertical axis in the direction of protrusion of the probe tip 31. The support structure section 15 includes two spring structure sections of a first spring structure section 20 deformable in the direction of the vertical axis; and a second spring structure section 25 deformable in the direction of the lateral axis, and a reflection surface 32 which is formed with a reflection pattern varying the reflectance within the surface is provided at the side opposite to the probe tip 31 of the head section 30. By using this structure, there are obtained the measurement probe, the sample surface measuring apparatus, and the sample surface measuring method, which can improve the accuracy of measurement of the sample surface without using a special measuring system.

16 Claims, 18 Drawing Sheets

FOREIGN PATENT DOCUMENTS

| | | |
|---|---|---|
| JP | 2755333 | 3/1998 |
| JP | 10221355 | 8/1998 |
| JP | 10282130 | 10/1998 |
| JP | 11166823 | 6/1999 |
| JP | 2000105184 | 4/2000 |
| JP | 2000171381 | 6/2000 |
| JP | 2000258331 | 9/2000 |
| JP | 2000258332 | 9/2000 |
| JP | 2001056281 | 2/2001 |

OTHER PUBLICATIONS

"A new force sensor incorporating force-feedback control for interfacial force microscopy", S.A. Joyce and J.E. Houston, Rev. Sci. Instrum. vol. 62, No. 3, pp. 710-715, Mar. 1991.

International Search Report for international application No. PCT/JP2007/052626, dated Mar. 22, 2007.

* cited by examiner (a)

(b)

(a)

(b)

(c)

(a)

(b)

(c)

(a)

(b)

(c)

5 μm

5 μm

5 μm

MEASURING PROBE, SAMPLE SURFACE MEASURING APPARATUS AND SAMPLE SURFACE MEASURING METHOD

TECHNICAL FIELD

The present invention relates to a measurement probe which is used to measure the surface of a sample, and a sample surface measuring apparatus and sample surface measuring method using the measurement probe.

BACKGROUND ART

There is a known sample surface measuring apparatus, called a Friction Force Microscope (FFM), or a Lateral Force Microscope (LFM) as a technology capable of material evaluation on nanometer scale and the like through the measurement of friction force distribution on the surface of the sample (for example, refer to Document 1: Japanese Patent Application Laid-Open No. 2000-171381, Document 2: Japanese Patent Application Laid-Open No. 2000-258331). In the friction force microscope, as illustrated in FIG. 8 for example, a fine cantilever 6 (100 μm order of length and 1 μm order of thickness) having a lever section 62 fixed to a base section 60 is used as a measurement probe, and the surface of the sample S is measured by using a probe tip 61 having a sharp tip of several nanometers or smaller size, provided at an end portion of the lever section 62.

That is, the cantilever 6 scans the surface of the sample along a scanning direction orthogonal to a support axis direction which is a long axis direction of the lever section 62 and a probe tip axis direction which is a direction of protrusion of the probe tip 61. During scanning, a friction force (lateral force) is applied to the probe tip 61 in the direction of the scanning axis (lateral axis), thereby inducing "torsion" on the lever section 62. Also depending on the surface shape of the sample, a load (vertical force) is applied to the probe tip 61, thereby inducing "deflection" on the lever section 62. By measuring the torsion and the deflection generated on the lever section 62, the force in the two directions, lateral force and vertical force, generated by the scanning of the sample can be determined, thus being able to acquire surface information of the sample. Furthermore, based on the ratio of the lateral force and the vertical force, a friction coefficient on the sample surface can be determined.

By using the above measuring method, for example, for the sample of a composite material such as a reinforced plastic made from a resin reinforced with carbon fibers used for airframes of aircraft and the like, or a glass containing dispersed fine particles to provide the glass with new functions, a distribution of constituent materials in the composite material can be investigated by preparing a cross-sectional surface of the sample, and measuring the friction coefficient distribution on the surface by using the above apparatus. Further, the friction characteristics and the lubrication characteristics of the material surface can be measured at nanometer scale by measuring the lateral force and the vertical force.

Patent Document 1: Japanese Patent Application Laid-Open No. 2000-171381
Patent Document 2: Japanese Patent Application Laid-Open No. 2000-258331
Patent Document 3: Japanese Patent Application Laid-Open No. 2000-258332
Patent Document 4: Japanese Patent Application Laid-Open No. H11-166823
Patent Document 5: Japanese Patent Application Laid-Open No. 2001-56281
Non-Patent Document 1: B. W. Chui et al., Applied Physics Letters, Vol. 72, No. 11, pp. 1388-1390 (1998)
Non-Patent Document 2: S. A. Joyce and J. E. Housion, Rev. Sci. Instrum. Vol. 62, No. 3, pp. 710-715 (1991)

DISCLOSURE OF THE INVENTION

Problems to be Solved by the Invention

In the sample surface measurement using the above-described cantilever 6, the deformation caused by the torsion and the deflection on the lever section 62 can be measured by the optical lever method. In the optical lever method, laser light is irradiated as the measurement light onto the rear surface of the lever section 62, and the reflection angle of the light reflected by the rear surface is detected by using a four-segment photodiode or the like, thereby both the torsion and the deflection on the lever section 62 can be determined. The optical lever method is also used in ordinary Atomic Force Microscope (AFM) for measuring a deflection which occurs when detecting the atomic force, and the method has an advantage of being capable of measuring the friction force by ordinary AFM apparatus if only the photodetection device for detecting the reflected light is changed from the two-segment type for measuring the deflection to the four-segment type for measuring both the torsion and the deflection.

The method to determine the lateral force and the vertical force based on the torsion and the deflection of the lever section 62, however, has a problem of difficulty in attaining high accuracy in principle because the method measures deformations of a single lever to induce interference of deformations in two directions with each other. For this point, there is proposed a measurement probe 7 which has a structure shown in FIG. 9 in which the lever section, fixed to a base section 70 and with the probe tip 71 at an end portion thereof, is provided with a leaf spring section 72 for measuring the vertical force and a leaf spring section 73 for measuring the lateral force (refer to the above Document 2: Japanese Patent Application Laid-Open No. 2000-258331).

The method, however, needs to measure deformations on the two leaf spring sections separately, though the method can improve the problem of deteriorated measurement accuracy caused by the interference between two directional deformations. In this case, for example the optical lever method needs a special measuring system which uses two laser light beams for optical levers, as shown by a solid line arrow and dashed line arrow in FIG. 9, which has a problem of being inapplicable for measurement in ordinary specification of AFM apparatus.

The present invention has been derived to solve the above problems, and an object of the invention is to provide a measurement probe which can improve the measurement accuracy for the sample surface without using special measuring system, a sample surface measuring apparatus using the measurement probe, and a sample surface measuring method.

Means for Solving the Problem

To achieve the above object, a measurement probe of the present invention is the one used for measuring surface of a sample; the measurement probe comprises: (1) a base section; (2) a head section having a probe tip for measuring the surface; and (3) a support structure section which supports the head section with the base section along a first axis as a support axis substantially orthogonal to a probe tip axis in the direction of protrusion of the probe tip, wherein (4) the support structure section includes two spring structure sections of a first spring structure section which is deformable in the direction of the probe tip axis, and a second spring structure section which is deformable in the direction of a second axis substantially orthogonal to the probe tip axis and the first axis, and wherein (5) the head section has a reflection surface which is provided at the side opposite to the probe tip and formed with a reflection pattern, varying the reflectance so as to include different reflectance values within the surface.

According to the above-described measurement probe, the support structure section located between the base section as the fixing section and the head section having the probe tip adopts a structure section with the first spring structure section (first deformation structure section) deformable in the direction of the probe tip axis (vertical axis) and the second spring structure section (second deformation structure section) deformable in the direction of the second axis (lateral axis). With this structure having the two spring structure sections used to measure the vertical force and the lateral force, respectively, the interference of two directional deformations between each other can be prevented, and the measurement accuracy for the surface of the sample can be improved. The term "spring structure section" referred to herein signifies a structure portion which elastically deforms, including for example a leaf spring and torsion spring.

Furthermore, the head section provided at an end portion of the support structure section has a reflection surface which is used for measuring the deformation of the spring structure section by the optical lever method, and within the reflection surface, the reflectance varies in a specific pattern. When a measurement light for the optical lever method is irradiated onto the reflection surface having the above structure, a two-dimensional light image is obtained, which reflects the reflection pattern in the reflection surface, by the generated reflected light. Thus, by detecting the two-dimensional light image by a photodetection device, it becomes possible to measure both the deformation in the vertical axis direction in the first spring structure section and the deformation in the lateral axis direction in the second spring structure section, by using a single measurement light beam, and without using special measuring system.

A sample surface measuring apparatus according to the present invention comprises: (a) the above-described measurement probe for measuring the surface of the sample; (b) measurement light supplying means to supply measurement light for measuring a deformation of the support structure section in the measurement probe; (c) reflected light image detecting means to detect a reflected light image formed by the measurement light reflected by the reflection surface of the head section of the measurement probe; and (d) surface information processing means to acquire surface information of the sample based on the result of detection of the reflected light image by the reflected light image detecting means, wherein (e) the reflected light image which is detected by the reflected light image detecting means is a two-dimensional light image formed by an irradiation pattern of the measurement light on the reflection surface and by the reflection pattern of the reflection surface, and wherein (f) the surface information processing means acquires both the surface information in the direction of the probe tip axis and the surface information in the direction of the second axis based on the result of detection of the reflected light image.

A sample surface measuring method according to the present invention comprises: (a) by applying the above-described measurement probe for measuring the surface of the sample: (b) a measurement light supplying step of supplying a measurement light for measuring a deformation of the support structure section in the measurement probe; (c) a reflected light image detecting step of detecting a reflected light image formed by the measurement light reflected by the reflection surface of the head section of the measurement probe; and (d) a surface information processing step of acquiring surface information of the sample based on the result of detection of the reflected light image in the reflected light image detecting step, wherein (e) the reflected light image which is detected in the reflected light image detecting step is a two-dimensional light image formed by an irradiation pattern of the measurement light on the reflection surface and by the reflection pattern of the reflection surface, and wherein (f) the surface information processing step acquires both the surface information in the direction of the probe tip axis and the surface information in the direction of the second axis based on the result of detection of the reflected light image.

In the above-described sample surface measuring apparatus and measuring method, it becomes possible to acquire the surface information of the sample at high measurement accuracy without using special measuring system, by using the measurement probe having the above structure, supplying the measurement light to the measurement probe, and detecting the reflected light image. In particular, by detecting the reflected light image which is a two-dimensional light image corresponding to the reflection pattern of the reflection surface formed on the head section of the measurement probe, a single measurement light beam allows measurement of both the deformation in the vertical axis direction at the first spring structure section and the deformation in the lateral axis direction at the second spring structure section, and thus the surface information in both directions of vertical axis and lateral axis can be obtained with a simple configuration.

Effects of the Invention

According to the measurement probe, the sample surface measuring apparatus, and the sample surface measuring method according to the present invention, the measurement accuracy for the sample surface can be improved without using special measuring system, by using the support structure section having the first spring structure section deformable in the direction of vertical axis and the second spring structure section deformable in the direction of lateral axis, providing the reflection surface of the head section at an end portion of the support structure section, and adopting the structure in which the reflectance vary in a specific pattern within the reflection surface.

DESCRIPTION OF SYMBOLS

Figure 1:
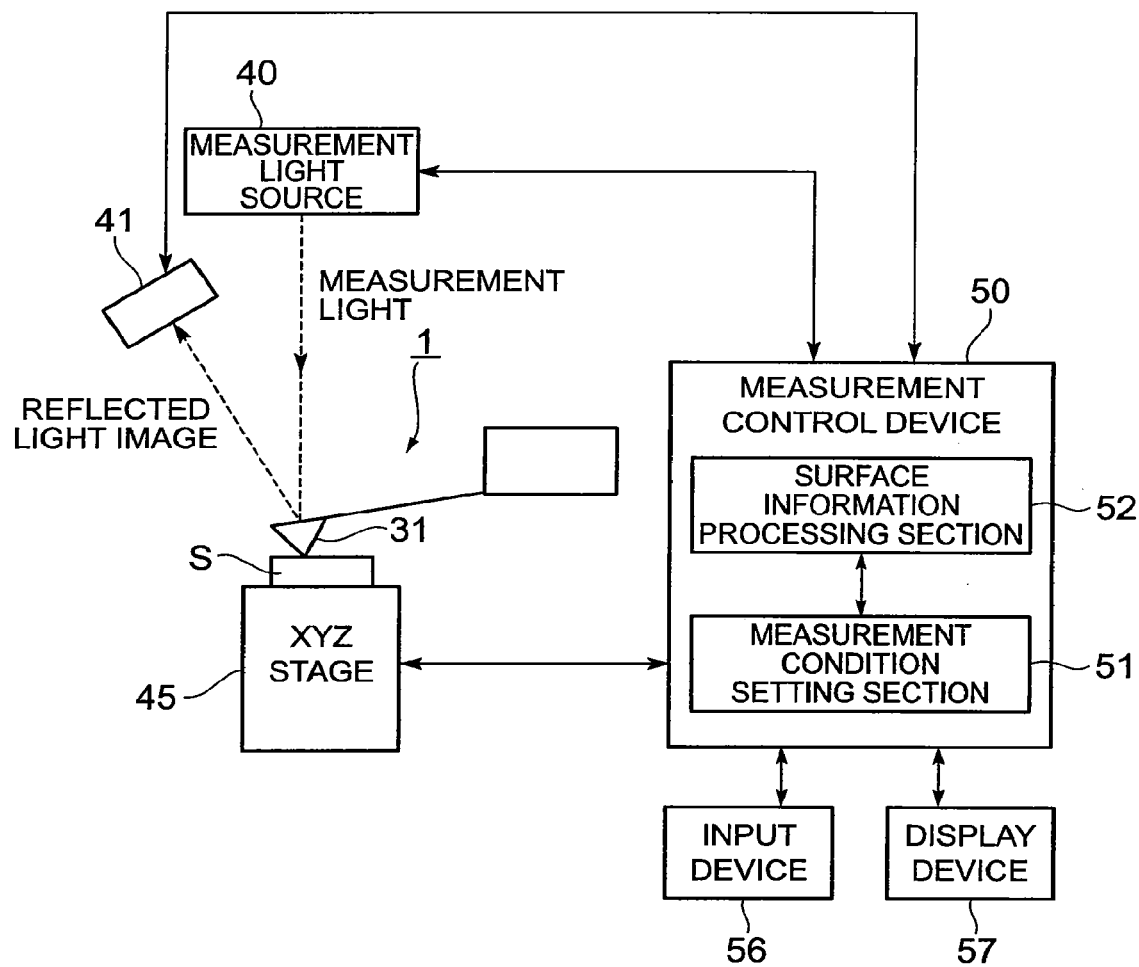
FIG. 1 is a block diagram schematically illustrating a configuration of an embodiment of the sample surface measuring apparatus.

1—measurement probe, 10—base section, 11, 12—support section, 15—support structure section, 20—first spring structure section, 21, 22—torsion beam, 23—connection section, 25—second spring structure section, 26, 27—leaf spring, 30—head section, 31—probe tip, 32—reflection surface, 321—first reflection region, 322—second reflection region, 40—measurement light source, 41—four-segment photodiode, 41a-41d—photodetection segment, 45—XYZ stage, 50—measurement control device, 51—measurement condition setting section, 52—surface information processing section, 56—input device, 57—display device.

BEST MODES FOR CARRYING OUT THE INVENTION

Preferred embodiments of the measurement probe, the sample surface measuring apparatus, and the sample surface measuring method according to the present invention shall now be described in detail along with the drawings. In the description of the drawings, elements that are the same shall be provided with the same symbol and overlapping description shall be omitted. The dimensional proportions in the drawings do not necessarily match those of the description.

The description begins with an entire configuration of the sample surface measuring apparatus according to the present invention. FIG. 1 is a block diagram schematically illustrating a configuration of an embodiment of the sample surface measuring apparatus according to the present invention. This sample surface measuring apparatus comprises a measurement probe 1, a measurement light source 40, a four-segment photodiode 41, and a measurement control device 50.

The measurement probe 1 is a probe mechanism used to measure the surface of the sample S by using a probe tip 31 provided at an end portion thereof. In particular, the sample surface measuring apparatus according to this embodiment is configured as a friction force microscope which can measure both the vertical force in the direction orthogonal to the surface of the sample S, (hereinafter referred to as the "vertical direction"), and the lateral force in the direction parallel to the surface (hereinafter referred to as the "lateral direction").

Among these forces, the vertical force corresponds to a load applied to the probe tip 31, and for example reflects a surface shape of the sample S. The lateral force corresponds to a friction force applied to the probe tip 31, and for example reflects constituent materials of respective portions of the sample S. The sample S as the target for measuring the surface is placed on an XYZ stage 45 being movable in the X-axis direction and Y-axis direction (lateral direction), and in the Z-axis direction (vertical direction), and by driving this XYZ stage 45, it is possible to set and scan the measuring position by the measurement probe 1.

For the measurement probe 1 for measuring the surface of the sample S, there are provided the measurement light source 40 and the four-segment photodiode 41. The measurement light source 40 is measurement light supplying means to supply measurement light for measuring the deformation of the support structure section in the measurement probe 1, as described later, and the light source irradiates the measurement light such as laser light onto the measurement probe 1. The four-segment photodiode 41 is reflected light image detecting means to detect a reflected light image formed by the measurement light reflected by the reflection surface provided on the measurement probe 1.

The measurement control device 50 is configured, for example, by using PC, and is control means to execute necessary processing such as setup of conditions for surface measurement on the sample S in the measurement apparatus, execution of the surface measurement, data analysis, and the like. In this embodiment, the measurement control device 50 has a measurement condition setting section 51 and a surface information processing section 52. The measurement condition setting section 51 sets the measurement conditions such as the measuring position and the scanning speed for the surface of the sample S, by controlling the XYZ stage 45 on which the sample S is placed, the measurement light source 40 which supplies the measurement light, and the like. As for the control of the XYZ stage 45, the measurement light source 40, and the like, the operator may manually control them instead of automatic control by the control device 50.

The surface information processing section 52 is processing means which accepts the detection result of the reflected light image obtained by the four-segment photodiode 41 as the reflected light image detecting means, and acquires the surface information of the sample S based on the entered detection result. In particular, in the measurement apparatus, the surface information processing section 52 acquires both the surface information in the direction of the vertical axis and the surface information in the direction of the lateral axis based on the detection result of the reflected light image.

In addition, for the measurement control device 50, an input device 56 and a display device 57 are connected. The input device 56 is, for example, a keyboard or a mouse, and is used to enter instructions or the like necessary for measuring the surface of the sample S. The display device 57 is, for example, a liquid crystal display, and is used to display information relating to the surface measurement of the sample S, or to display the surface information acquired by the surface measurement, and the like.

Figure 2:
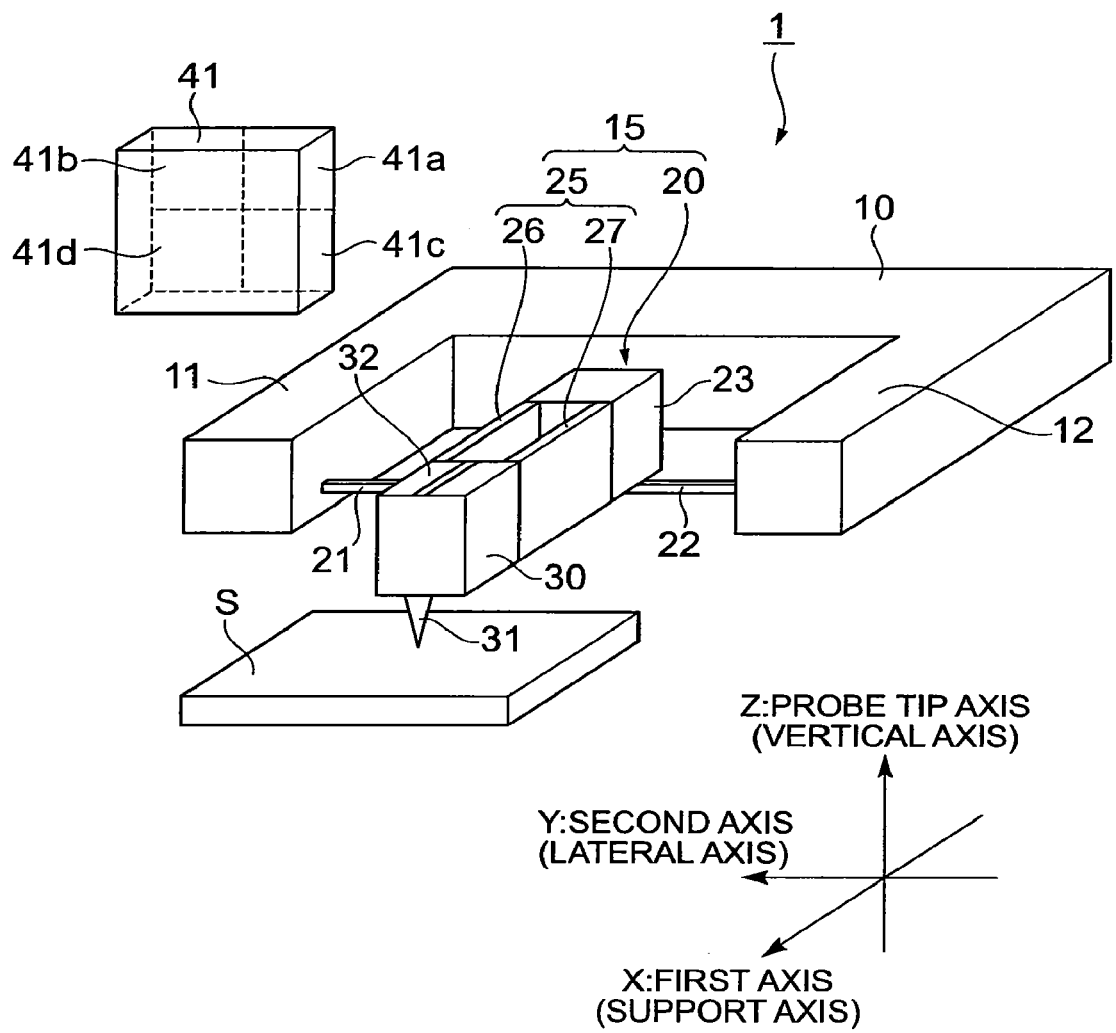
FIG. 2 shows a perspective view of a configuration of an embodiment of the measurement probe.
Figure 3:
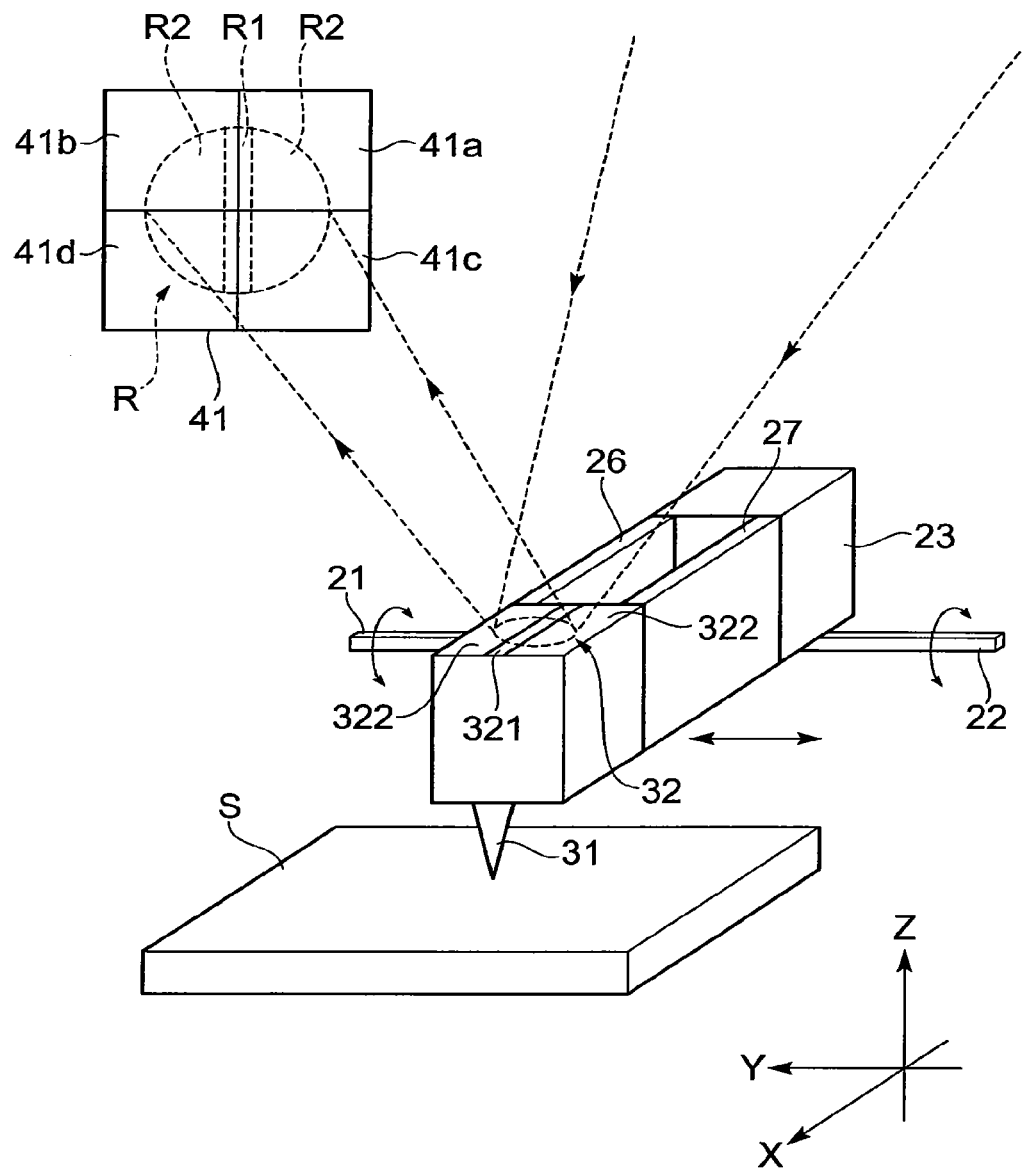
FIG. 3 is a schematic drawing of an example of the sample surface measuring method by using the measurement probe.

Next is the description of a structure of the measurement probe 1 used in the sample surface measuring apparatus according to the embodiment. FIG. 2 shows a perspective view of a configuration of an embodiment of the measurement probe according to the present invention. FIG. 3 is a schematic drawing of an example of the sample surface measuring method using the measurement probe shown in FIG. 2. The measurement probe 1 in this embodiment has a base section 10, a support structure section 15, and a head section 30.

For convenience in description, there are defined X-axis, Y-axis, and Z-axis as shown in FIG. 2. That is, the vertical axis orthogonal to the surface of the sample S and the probe tip axis in the direction of protrusion of the probe tip 31 of the measurement probe 1 is defined as the Z-axis, the support axis in the measurement probe 1 in the direction orthogonal to the probe tip axis is defined as the X-axis (the first axis in the lateral direction), and the lateral axis orthogonal to the Z-axis and to the X-axis is defined as the Y-axis (the second axis in the lateral direction). According to the definitions of the respective axes, the force in the direction of Z-axis is the vertical force, and the force in the direction of Y-axis is the lateral force.

The base section 10 forms the apparatus-side portion of the measurement probe 1, and functions as the probe-holding section which holds the support structure section 15 and the head section 30 with the apparatus. In this embodiment, the base section 10 has a pair of support sections 11 and 12 which are arranged to put the support structure section 15 therebetween in the direction of Y-axis (sandwiching from left and right sides in FIG. 2). These support sections 11 and 12 are formed so as to protrude forward from the respective side portions of the base section 10 along the X-axis.

The head section 30 forms the front-end portion of the measurement probe 1, and the probe tip 31 is provided at one surface of this section (lower face in FIG. 2). The probe tip 31 is located protruding downward along the Z-axis to the surface of the sample S as the measurement target. The probe tip 31 has a sharp tip of, for example, several nanometers or smaller in the front end diameter, thus enabling the probe to execute high-resolution surface measurement.

Between the base section 10 and the head section 30, there is provided a support structure section 15 which supports the head section 30 with the base section 10 with the X-axis as the support axis. In the surface measurement using the measurement probe 1, the surface information of the sample S is acquired by measuring the deformations in the directions of vertical axis and lateral axis, which are generated in the support structure section 15 under the scanning of the surface of the sample S. In this embodiment, the support structure section 15 includes a first spring structure section 20 at the base section 10 side and a second spring structure section 25 at the head section 30 side.

The first spring structure section (first deformation structure section) 20 is elastically deformable in the direction of vertical axis (Z-axis), and is used to measure the vertical force in the surface measurement of the sample S. Specifically, the first spring structure section 20 consists of torsion beams 21 and 22, and a connection section 23. The torsion beams 21 and 22 are arranged so as to extend in the lateral axis direction, respectively, to connect the base section 10 with the support structure section 15 (the rest of the support structure section 15 excluding the torsion beams 21 and 22). The torsion beams 21 and 22 are formed to allow torsion deformation as illustrated in FIG. 3, thus functioning as torsion springs.

According to the structure shown in FIG. 2, there are provided the pair of torsion beams 21 and 22, corresponding to the structure of the base section 10 which has the pair of support sections 11 and 12, so as to connect the rest of the support structure section 15 respectively with the pair of support sections 11 and 12. The connection section 23 is a section to connect the base section 10 and the first spring structure section 20 with the second spring structure section 25. The above-described torsion beams 21 and 22 are located between the connection section 23 and the support sections 11 and 12, respectively.

The second spring structure section (second deformation structure section) 25 is elastically deformable in the direction of lateral axis (Y-axis), and is used to measure the lateral force in the surface measurement of the sample S. Specifically, the second spring structure section 25 consists of two sheets of leaf springs 26 and 27. The leaf springs 26 and 27 are arranged so as the respective faces in the lateral axis direction, and are formed to allow deflection deformation as illustrated in FIG. 3. The two leaf springs 26 and 27 form a parallel leaf spring having leaf springs arranged in parallel with each other. The connection section 23 of the first spring structure section 20 functions as a parallel leaf spring support section to support these leaf springs 26 and 27.

In the front side of the leaf springs 26 and 27 of the second spring structure section 25, the head section 30 having the probe tip 31 to measure the surface is connected, as described above. The head section 30 has a reflection surface 32 which is used to measure the deformation of the support structure section 15 (deformation of each of the first spring structure section 20 and the second spring structure section 25) by the optical lever method, on a face opposite to the face having the probe tip 31 (upper face of FIG. 2). The reflection surface 32 is formed so as the reflectance thereof to vary at a specific reflection pattern within the surface. That is, the reflection surface 32 is formed with a reflection pattern, varying the reflectance so as to include different reflectance values within the surface.

FIG. 2 and FIG. 3 illustrate an example of the structure of this type of reflection surface 32, having a first reflection region 321 extending in strip shape along the central axis of the reflection surface 32 in the X-axis direction and a second reflection region 322 having a reflectance different from that of the first reflection region 321. With this configuration, when the measurement light for the optical lever method is irradiated from the measurement light source 40 (refer to FIG. 1) to the reflection surface 32, the reflected light forms a two-dimensional light image which is generated by the irradiation pattern of the measurement light to the reflection surface 32 and by the reflection pattern of the measurement light on the reflection surface 32.

For the reflected light image, the four-segment photodiode 41 for detecting the reflected light image is formed with a four-segment type structure having a first photodetection segment 41a of upper left segment, a second photodetection segment 41b of upper right segment, a third photodetection segment 41c of lower left segment, and a fourth photodetection segment 41d of lower right segment, viewed from the light incidence side (rear side of the paper of FIG. 2 and FIG. 3). As shown in FIG. 3, for the light incident surface of the four-segment photodiode 41, the reflected light image from the reflection surface 32 of the measurement probe 1 enters the four-segment photodiode 41 as a light image R which includes a light image portion R1 corresponding to the first reflection region 321 on the reflection surface 32 and a light image portion R2 corresponding to the second reflection region 322.

With the above configuration, the probe tip 31 of the measurement probe 1 measures and scans the surface of the sample S, and the measurement light for measuring the deformation of the support structure section 15 is supplied from the measurement light source 40 to the measurement probe 1 (measurement light supplying step). At this time, the measurement light is reflected by the reflection surface 32 of the head section 30 having predetermined reflection pattern as described above, thus the reflected light image R is generated. Then, the reflected light image R is detected by the four-segment photodiode 41 which is the reflected light image detecting means (reflected light image detecting step). Furthermore, the surface information processing section 52 in the measurement control device 50 acquires both the surface information of the sample S in the direction of vertical axis (vertical force information) and the surface information in the direction of lateral axis (lateral force information), based on the result of detection of the reflected light image R obtained by the four-segment photodiode 41 (surface information processing step).

In particular, in the reflected light image R, the incidence condition and the detection condition and the like on the four-segment photodiode 41 vary with the displacement of the head section 30 induced by the deformation of the first spring structure section 20 in the support structure section 15 in the vertical direction, and by the deformation of the second spring structure section 25 in the lateral direction. Specifically, the detection position of the reflected light image R itself on the four-segment photodiode 41, or the detection pattern of the reflected light within the light image R vary with the deformations of the support structure section 15 in the vertical direction and in the lateral direction. In the surface information processing section 52, the surface information of the sample S is acquired referring to the variation of the position of the reflected light image R and to the variation of the detection pattern of the reflected light within the reflected light image R.

The following is the description of the effects of the measurement probe, the sample surface measuring apparatus, and the sample surface measuring method according to the present embodiment.

In the measurement probe shown in FIGS. 1 to 3, as the support structure section 15 located between the base section 10 as the fixing section on the apparatus side and the head section 30 having the probe tip 31 on the sample S side, the support structure section 15 with the first spring structure section 20 which is deformable in the direction of the probe tip axis (vertical axis) and the second spring structure section 25 which is deformable in the direction of the second axis (lateral axis) is used. With this structure having two spring structure sections 20 and 25 to measure the vertical force and the lateral force independently, the interference between the vertical force and the lateral force is in principle prevented, and it becomes possible to measure simultaneously the vertical force and the lateral force independently. As a result, the measurement accuracy for the surface of the sample S can be improved.

Furthermore, the above measurement probe 1 provides the head section 30 at an end portion of the support structure section 15 with the reflection surface 32 for measuring the deformation in the support structure section 15 using the optical lever method, and further provides a structure to vary the reflectance so as to include different reflectance values within the reflection surface 32 in a specific pattern. When the measurement light is irradiated from the measurement light source 40 to the reflection surface 32 having the above structure, the obtained reflected light generates a two-dimensional light image which reflects the reflection pattern on the reflection surface 32, as shown in FIG. 3 as an example of the reflected light image R detected by the four-segment photodiode 41.

By applying the reflected light image detecting means which can acquire information about the light image, as the photodetection device for detecting reflected light, for the two-dimensional reflected light image R, simultaneous measurement of the deformation of the first spring structure section 20 in the direction of vertical axis and the deformation of the second spring structure section 25 in the direction of lateral axis becomes possible. In particular, with the above structure, it is possible to measure the sample surface by using a single measurement light beam, and without using special measuring system, and in addition, installation of the structure into an AFM apparatus is easily available by utilizing the displacement detection system of a friction force microscope, built in an ordinary AFM apparatus.

With the sample surface measuring apparatus using the measurement probe 1 having the above-described structure and with the measuring method, the surface information of the sample S can be acquired at a high measurement accuracy by supplying the measurement light to the measurement probe 1 and detecting the reflected light image R. Furthermore, since there is no need of using a special measuring system as described above, it is possible to acquire surface information in both directions of vertical axis and lateral axis with a simple configuration.

Here, the document 2: Japanese Patent Application Laid-Open No. 2000-258331 discloses a structure having a reflection surface provided on a cantilever head which has different reflection angles of the measurement light depending on the positions. That type of structure, however, needs to fabricate the reflection surface so as to have a reflection angle distribution which allows the reflection angle to vary even when the probe tip moves at a distance of approximately 0.1 nm to 1.0 nm, and the fabrication of that type of reflection surface is difficult. On the other hand, the measurement probe 1 according to the present invention realizes the high accuracy measurement of vertical force and lateral force, by forming the reflection surface 32 on the head section 30 with a specific pattern varying the reflectance, and by projecting the reflected light image, obtained by reflecting the measurement light on the reflection surface 32, onto the face of photodetection device.

As for the specific structure of the first spring structure section 20 and the second spring structure section 25 of the support structure section 15, as described above, it is preferable to use a structure in which the vertical force and the lateral force can be measured independently in the surface measurement of the sample S. The term "spring structure section" referred to herein signifies the structure portion which elastically deforms, including varieties of configurations such as leaf spring and torsion spring.

The first spring structure section 20 used for measuring the vertical force preferably includes a torsion beam positioned so as to extend in the direction of the lateral axis and allowing torsion deformation while connecting the rest of the support structure section 15 with the base section 10, such as the torsion beams 21 and 22 in the above-described structure. In the above structure having the torsion beams 21 and 22, the head section 30 is displaced in the direction of vertical axis by inducing torsion in the torsion beams 21 and 22 on the lateral axis and deformation in the direction of vertical axis. As a result, the vertical force on the surface of the sample S can be accurately measured by (deflection in the vertical direction)× (equivalent spring constant of the torsion beams 21 and 22).

The second spring structure section 25 used for measuring the lateral force preferably includes two leaf springs arranged in parallel with each other and facing the lateral axis direction, respectively, such as the parallel leaf springs 26 and 27 in the above-described structure. In the above structure having the parallel leaf springs 26 and 27, the head section 30 is displaced in the direction of lateral axis by inducing deformation of the leaf springs 26 and 27 in the direction of lateral axis. As a result, the lateral force on the surface of the sample S can be accurately measured by (deflection in the lateral direction)×(spring constant of the parallel leaf springs 26 and 27).

By using the above-described structure with the support structure section 15 by combining the first spring structure section 20 having the torsion beams 21 and 22 extending in the lateral axis direction and the second spring structure section 25 having the parallel leaf springs 26 and 27 directing the lateral axis direction, highly accurate measurement of the vertical force and the lateral force can be achieved in the surface measurement of the sample S. Compared with the structure combining parallel leaf springs for measuring vertical force with parallel leaf springs for measuring lateral force, the above structure of support structure section 15 has advantages for separate measurement of vertical force and lateral force, and for measurement accuracy, such as ready application of high resonance frequency of the support structure section 15, thus attaining a structure being very little affected by external noise coming from mechanical vibrations mainly in the low frequency range. Here, the number of parallel leaf springs included in the second spring structure section 25 is at least two, and three or more may be adopted.

As the reflected light image detecting means to detect the two-dimensional light image of the reflected light, varieties of photodetection devices can be used, as long as it is possible to acquire the information of light image so as to be measurable of deformations in the directions of vertical axis and lateral axis, as described above. An example of this type of photodetection device is the four-segment photodiode 41 given in the above embodiment. Use of the four-segment photodiode 41 for detecting the reflected light image allows the use of facilities of ordinary AFM apparatus to suitably and readily measure the deformation of the first spring structure section 20 in the direction of vertical axis and the deformation of the second spring structure section 25 in the direction of lateral axis.

A photodetection device other than the four-segment photodiode may be applied. In general, it is preferable to use a segment type photodiode with at least four segments as the reflected light image detecting means. This kind of segment type photodiode includes, for example, in addition to the above-described four-segment photodiode, sixteen-segment photodiode and the like. It is specifically preferable to adopt four-segment photodiode as the segment type photodiode, in view of the structure of photodiode and of easiness of processing of detection signals output from the segment type photodiode.

Regarding the acquiring method of the surface information in the surface information processing section 52 of the measurement control device 50, it is preferable to acquire the surface information referring to the variation of the position of reflected light image R detected by the four-segment photodiode 41, and to the variation of detection pattern of the reflected light within the reflected light image R. The specific acquiring method of the surface information is preferably set depending on the reflection pattern of the reflection surface 32 formed on the head section 30 of the measurement probe 1.

Figure 4:
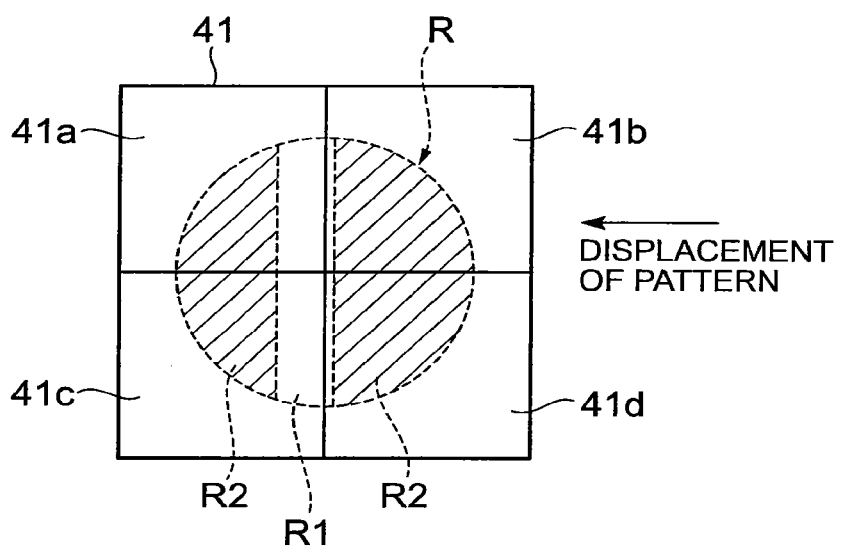
FIG. 4 is a schematic drawing of an example of the method for acquiring the surface information of the sample.
Figure 4:
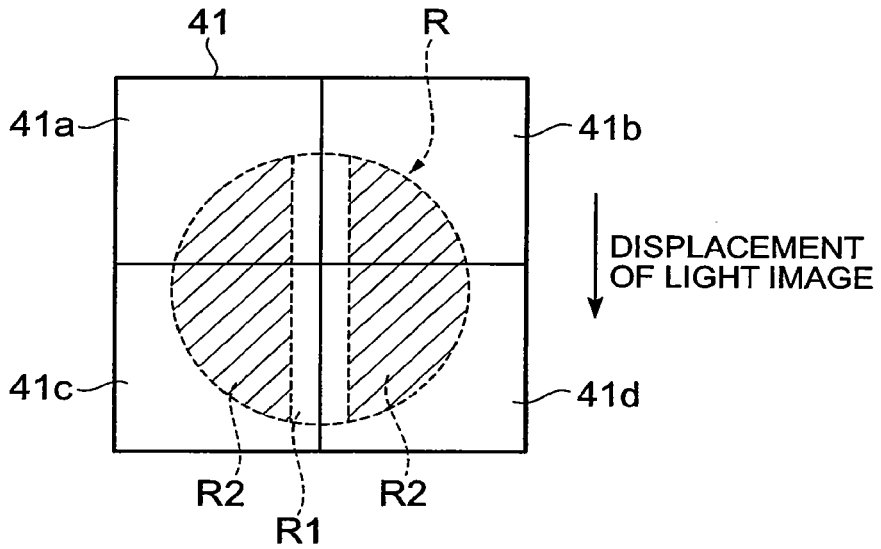

FIG. 4 is a schematic drawing of an example of the method for acquiring the surface information of the sample S for the case of using the measurement probe 1 and the four-segment photodiode 41 having the structure shown in FIG. 3. Here, the detection signal output from the first photodetection segment 41$a$ of the four-segment photodiode 41 is defined as A, the detection signal output from the second photodetection segment 41$b$ is defined as B, the detection signal output from the third photodetection segment 41$c$ is defined as C, and the detection signal output from the fourth photodetection segment 41$d$ is defined as D.

In the surface measurement of the sample S, when a deformation in the lateral direction (direction of the second axis) occurred, caused by deflections of the parallel leaf springs 26 and 27 of the second spring structure section 25 induced by the lateral force, the reflection surface 32 on the head section 30 is displaced in the lateral direction. At this time, as shown in (a) in FIG. 4, in the reflected light image R detected by the four-segment photodiode 41, the position of the light image R itself does not change, but the light image pattern including the light image portions R1 and R2, corresponding to the reflection regions 321 and 322 on the reflection surface 32, is displaced in the lateral direction, thereby varying the detection pattern of the reflected light within the light image R.

In this case, by deriving the difference of the intensity of detection signals at the left and right photodetection segments by the formula of $$(A+C)-(B+D),$$

the deformation of the support structure section 15 in the lateral direction, and the lateral force as the surface information of the sample S can be detected. Here, as for the incidence condition of the reflected light image to the segment type photodiode such as four-segment photodiode, it is preferable that, for a plurality of photodetection segments of the segment type photodiode, the reflected light image is incident on the photodetection segments so that, with respect to the displacement direction (lateral direction in the above example) of the reflected light image in the case that the measurement probe deforms in the direction of the second axis, the reflected light image is detected respectively by the photodetection segments (41$a$ and 41$c$) positioned at one side in the displacement direction, and by the photodetection segments (41$b$ and 41$d$) positioned at the other side. In general, it is preferable that the reflected light image is incident on the photodetection segments so that, with respect to the displacement direction of the reflected light image, the reflected light image is detected by at least two photodetection segments, respectively, being arranged in the displacement direction.

In the surface measurement of the sample S, when a deformation in the vertical direction (direction of the probe tip axis) occurred, caused by torsions of the torsion beams 21 and 22 of the first spring structure section 20 induced by the vertical force, the reflection surface 32 on the head section 30 is displaced in the vertical direction. At this time, as shown in (b) in FIG. 4, in the reflected light image R detected by the four-segment photodiode 41, the position of the light image R itself is displaced in the vertical direction, while the detection pattern of the reflected light within the light image R does not change.

In this case, by deriving the difference of the intensity of detection signals at the upper and lower photodetection segments by the formula of $$(A+B)-(C+D),$$

the deformation of the support structure section 15 in the vertical direction, and the vertical force as the surface information of the sample S can be detected. Here, as for the incidence condition of the reflected light image to the segment type photodiode such as four-segment photodiode, it is preferable that, for a plurality of photodetection segments of the segment type photodiode, the reflected light image is incident on the photodetection segments so that, with respect to the displacement direction (vertical direction in the above example) of the reflected light image in the case that the measurement probe deforms in the direction of the probe tip axis, the reflected light image is detected respectively by the photodetection segments (41a and 41b) positioned at one side in the displacement direction, and by the photodetection segments (41c and 41d) positioned at the other side. In general, it is preferable that the reflected light image is incident on the photodetection segments so that, with respect to the displacement direction of the reflected light image, the reflected light image is detected by at least two photodetection segments, respectively, being arranged in the displacement direction.

As described above, the measurement probe 1 having the structure shown in FIG. 2 and FIG. 3 allows detecting the vertical force by using the variation of position of the reflected light image R detected by the four-segment photodiode 41, and simultaneously detecting the lateral force, independent of the detection of the vertical force, by using the variation of the detection pattern of the reflected light within the reflected light image R.

Figure 5:
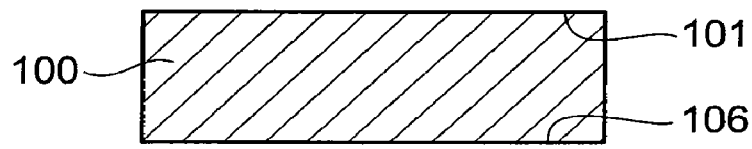
FIG. 5 illustrates an example of the method for fabricating the measurement probe.
Figure 5:
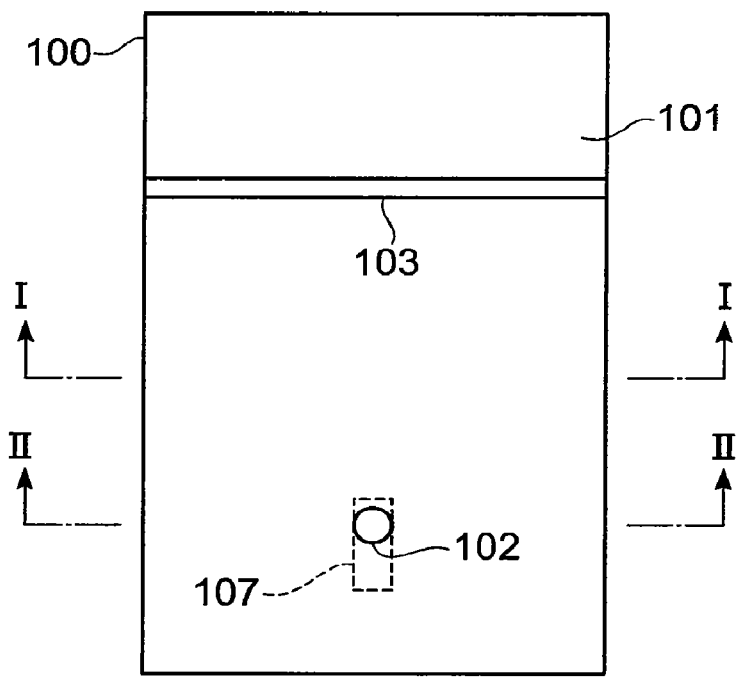
Figure 5:
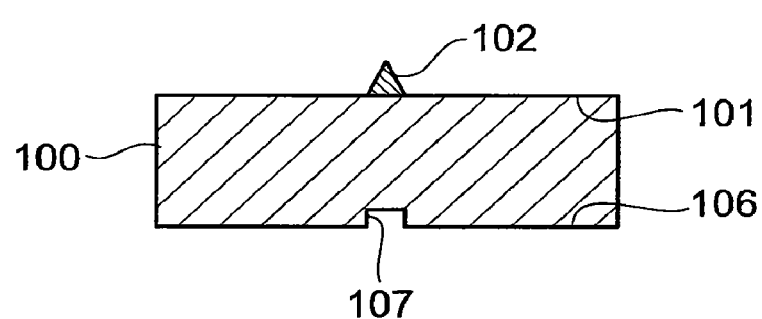
Figure 6:
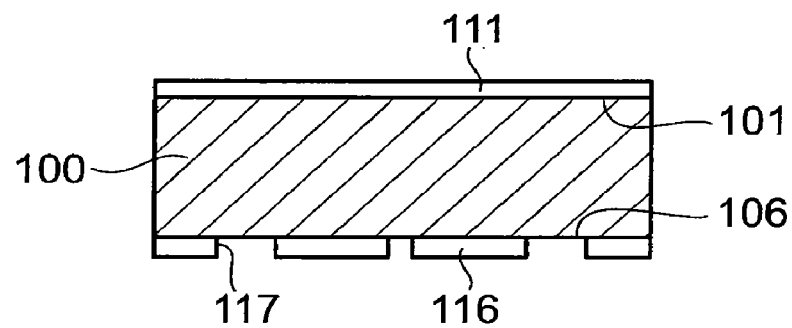
FIG. 6 illustrates an example of the method for fabricating the measurement probe.
Figure 6:
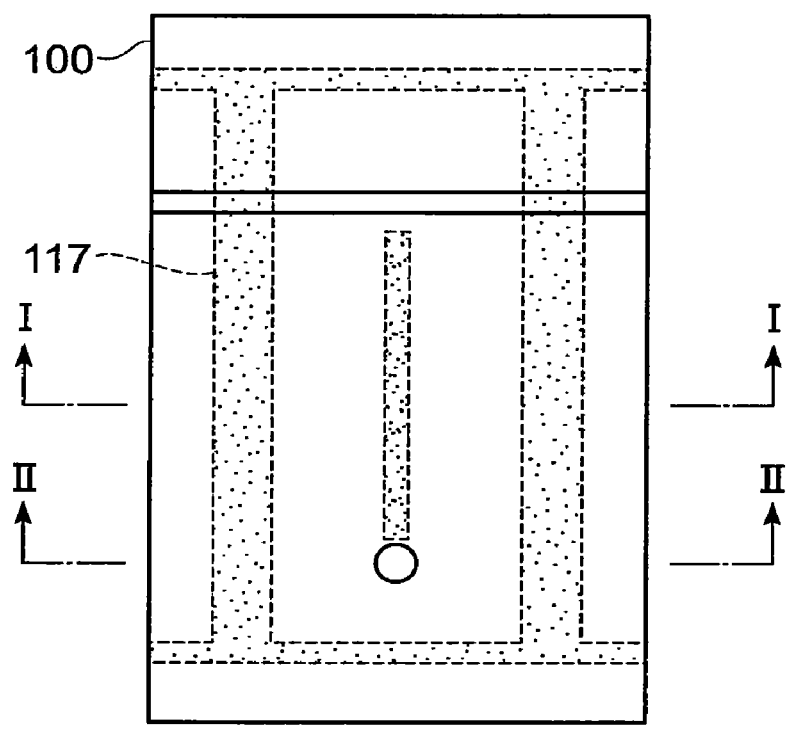
Figure 6:
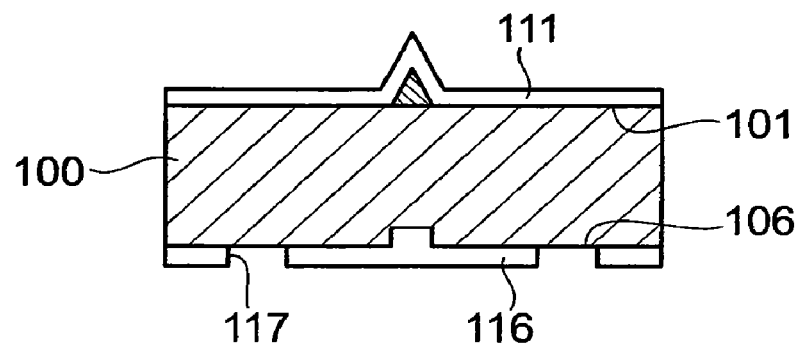
Figure 7:
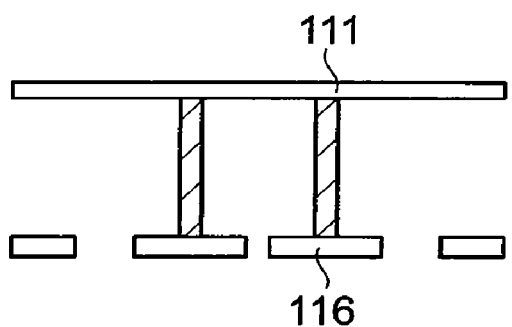
FIG. 7 illustrates an example of the method for fabricating the measurement probe.
Figure 7:
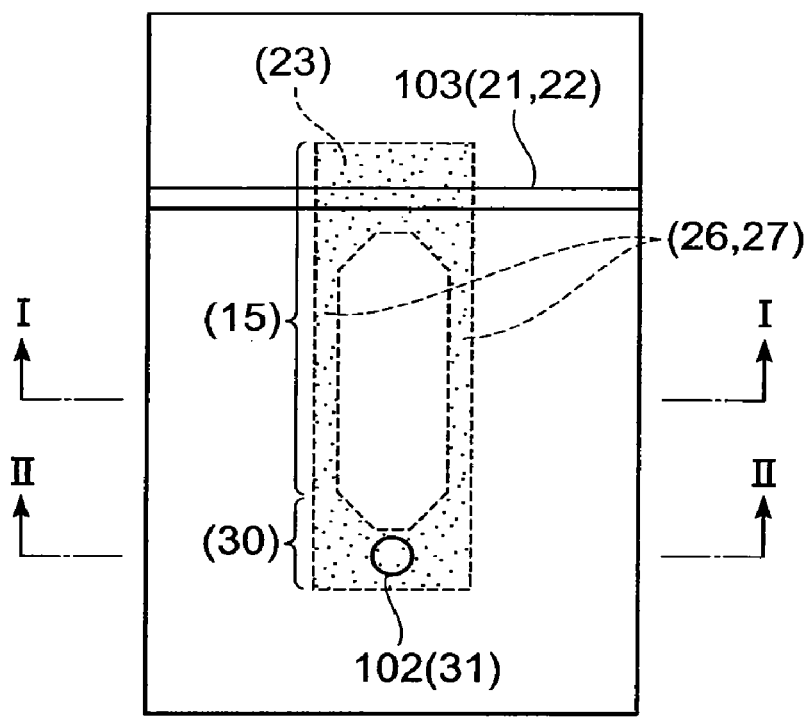
Figure 7:
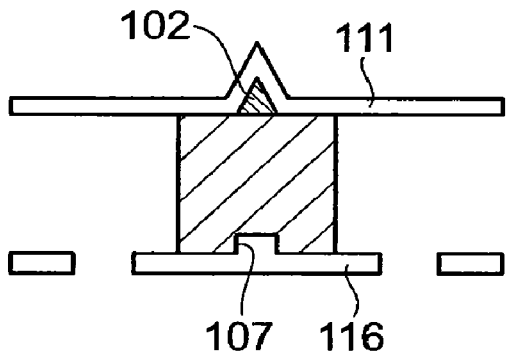
Figure 8:
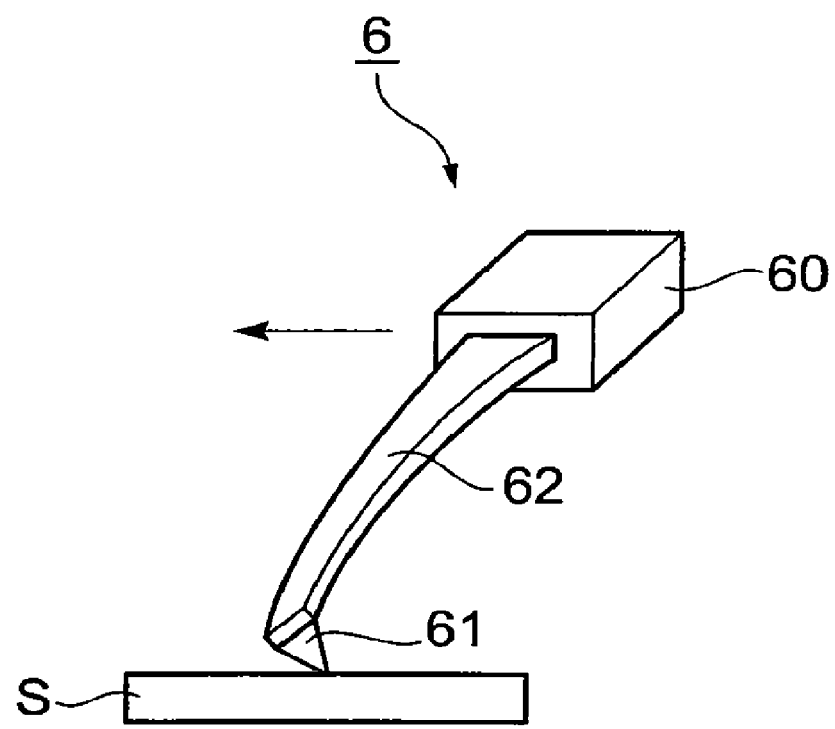
FIG. 8 shows an example of a structure of the conventional measurement probe.
Figure 9:
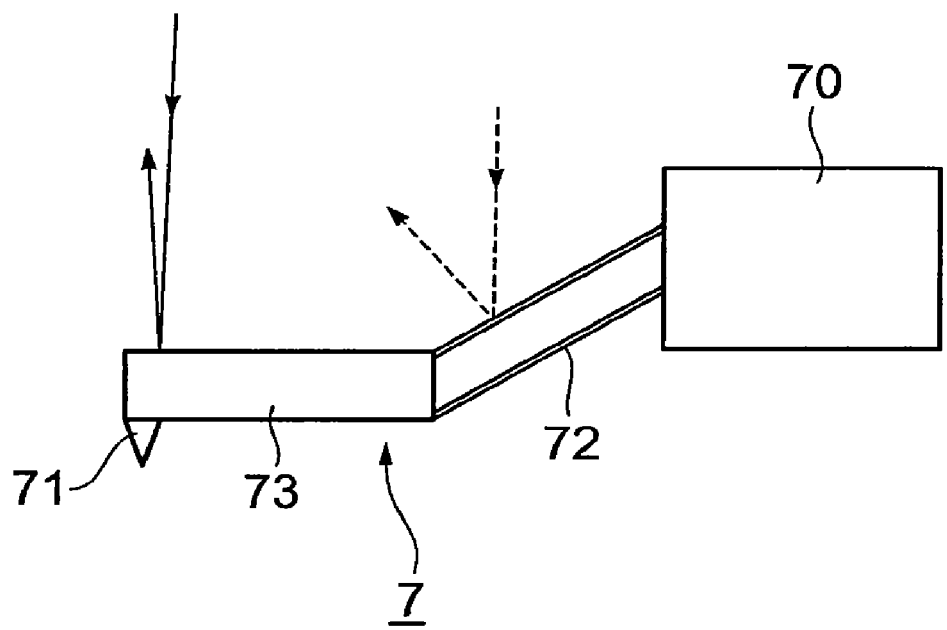
FIG. 9 shows another example of a structure of the conventional measurement probe.

A fabricating method of the measurement probe 1 in the above embodiment will be schematically described below. FIGS. 5 to 7 illustrate an example of the method for fabricating the measurement probe 1. In this example, a single-crystal (100) silicon substrate which is used in the electronics semiconductor industry is used as a base material for fabricating the measurement probe 1. In the respective figures, (b) in FIG. 5, (b) in FIG. 6, and (b) in FIG. 7 show the plan views of the substrate in the respective fabrication steps, (a) in FIG. 5, (a) in FIG. 6, and (a) in FIG. 7 show the I-I sectional views, and (c) in FIG. 5, (c) in FIG. 6, and (c) in FIG. 7 show the II-II sectional views.

When the single-crystal silicon substrate is used as the base material, use of different etching rates on the crystal planes for a chemical etchant, (crystal anisotropic etching), or use of reactive ion etching can provide parallel leaf springs having 1 μm order of plate thickness and 100 μm order of width. The use of this kind of parallel leaf springs allows the lateral force measurement at high sensitivity of 1 nN order. By using a similar method, there can be fabricated a torsion beam having 1 μm order of thickness and 10 μm order of width. The use of this kind of torsion beams allows the measurement at high sensitivity of 1 nN order, also in the vertical force measurement. An example of the structure of the torsion beam is a long and thin square rod having approximately 20×20 μm$^2$ in cross section and 1 mm in length.

In the fabrication example of the measurement probe 1 shown in FIGS. 5 to 7, first, a (100) silicon substrate 100 is prepared as illustrated in FIG. 5, and on one face 101 (lower face in the measurement probe 1) side, there are formed a protrusion structure 102 which becomes the probe tip 31, and a ridge structure 103 which becomes the torsion beams 21 and 22. On the other face 106 (upper face in the measurement probe 1) side, there is formed a groove structure 107 which becomes the reflection pattern of the reflection surface 32. The groove structure 107 becomes the first reflection region 321 which does not reflect the measurement light (having low reflectance) on the reflection surface 32, forming the reflection pattern of the reflection surface 32 together with the second reflection region 322 which reflects the measurement light.

Next, as illustrated in FIG. 6, silicon oxide films 111 and 116 are formed on the respective faces 101 and 106 of the silicon substrate 100. Also for the silicon oxide film 116 on the face 106, a slit-shaped aperture 117 for silicon etching is formed in the area shown by dashed line in (b) in FIG. 6.

Subsequently, as illustrated in FIG. 7, the silicon substrate 100 is immersed in an aqueous solution of potassium hydroxide to etch the silicon. At this stage, (100) and (010) planes are selectively exposed because of the crystal anisotropy of silicon, thus forming a vertical face of the (010) plane. As a result, as indicating the area by dashed line in (b) in FIG. 7, there is formed a structure which becomes the support structure section 15 and the head section 30 in the measurement probe 1.

In the etching of the silicon substrate 100 of this stage, the etching completes before the ridge structure 103 is etched. Alternatively, a buried layer made of a material such as silicon oxide not being etched may be preliminarily formed beneath the ridge structure 103. In this case, the ridge structure 103 is protected by the buried layer, thus improving the accuracy of fabrication of the measurement probe and the easiness of fabrication. Finally, the oxide film is removed by aqueous solution of hydrofluoric acid or the like to obtain the measurement probe 1. Although FIGS. 5 to 7 do not show, the base section 10 of the measurement probe 1 can be fabricated from the silicon substrate in similar procedure.

For the measurement probe, the sample surface measuring apparatus, and the sample surface measuring method according to the present invention, further description is given below together with the detailed fabrication example of the measurement probe.

Figure 10:
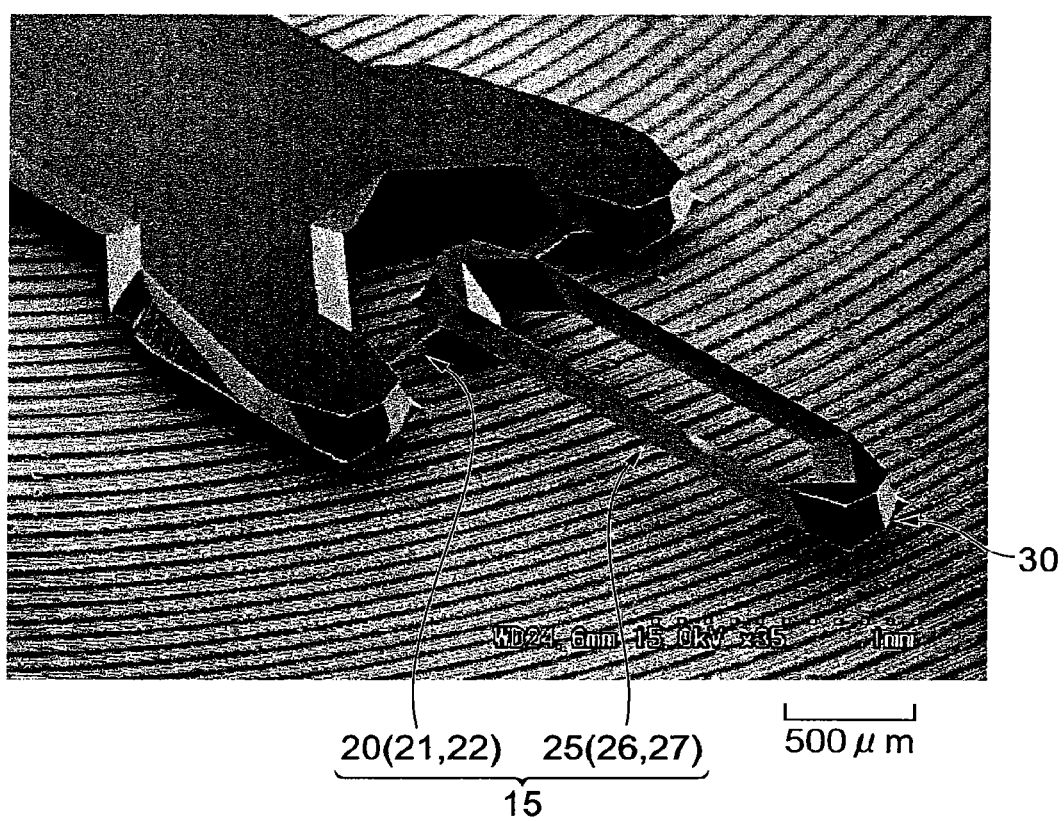
FIG. 10 is an SEM image showing entire structure of a fabrication example of the measurement probe.
Figure 11:
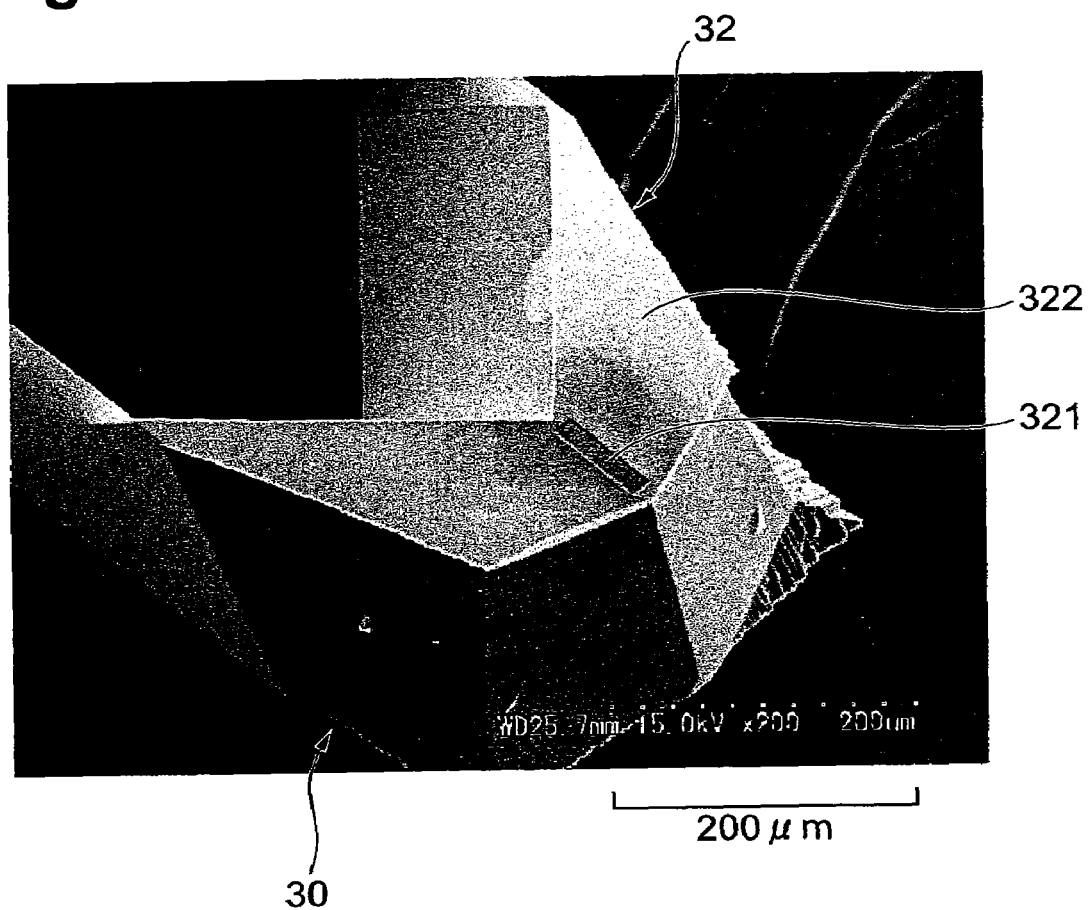
FIG. 11 is an SEM image showing enlarged view of a structure of the reflection surface provided on the upper face of the head section of the measurement probe shown in FIG. 10.
Figure 12:
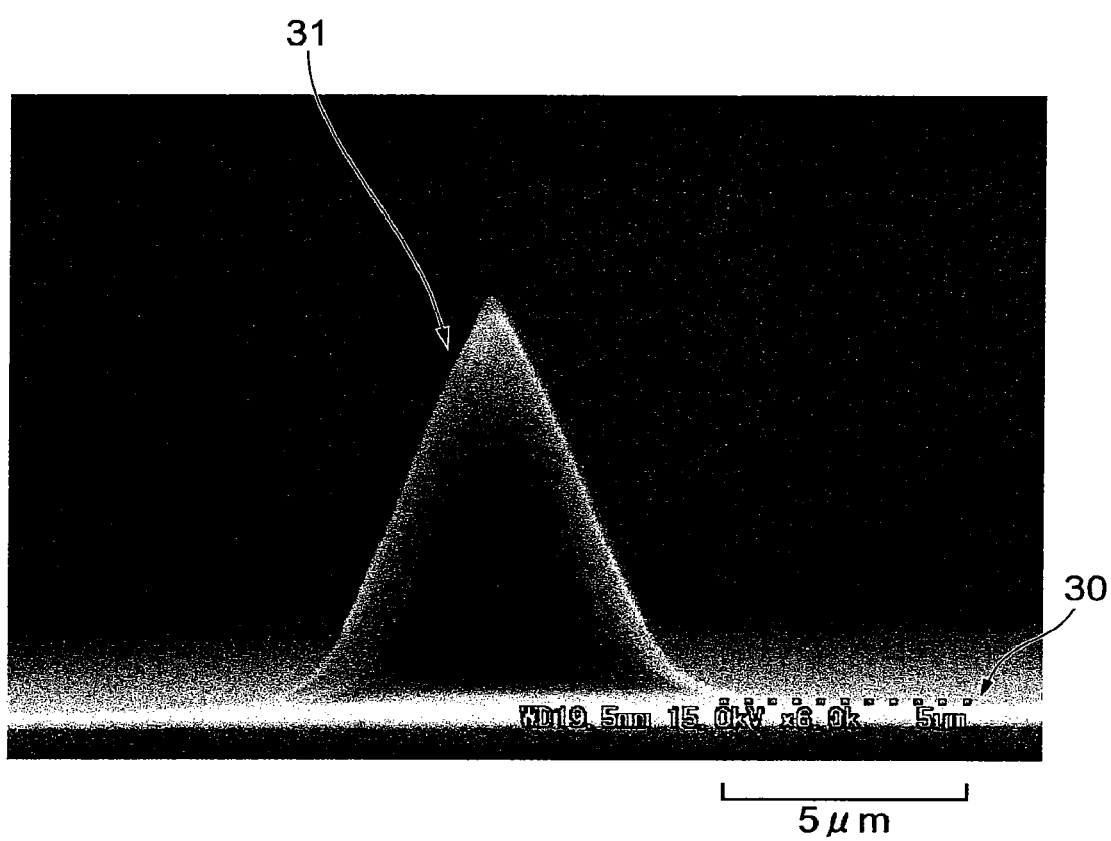
FIG. 12 is an SEM image showing enlarged view of a structure of the probe tip provided on the lower face of the head section of the measurement probe shown in FIG. 10.

FIG. 10 is an SEM (Scanning Electron Microscope) image showing entire structure of an example of fabrication of the measurement probe. The measurement probe in this fabrication example is obtained using the above-described fabrication method with FIGS. 5 to 7. FIG. 11 is an SEM image showing enlarged view of the structure of the reflection surface formed on the upper face of the head section of the measurement probe shown in FIG. 10. FIG. 12 is an SEM image showing enlarged view of the structure of the probe tip formed on the lower face of the head section of the measurement probe shown in FIG. 10.

As shown in these images, this fabrication example favorably formed the measurement probe which contains the head section 30 having the probe tip 31 and the reflection surface 32 including the first reflection region 321 and the second reflection region 322, and the support structure section 15 which has the first spring structure section 20 with the torsion beams 21 and 22, and the second spring structure section 25 with the leaf springs 26 and 27.

With the measurement probe given in the fabrication example shown in FIGS. 10 to 12, the measurement of lateral force and vertical force on the sample surface was performed. In this measurement, the measurement sample was a silicon substrate coated with a fluorine-base liquid lubrication film thereon. The lubrication film was coated by the dip method to form almost flat surface and to give about 3.5 nm in film thickness so as to provide an adequate friction distribution. After coating, ultraviolet light was irradiated to let the film being adsorbed relatively strongly to the substrate, followed by immersing the substrate again in a solvent to remove excess amount of lubricant.

For thus prepared measurement sample, simultaneous measurement of the lateral force and the vertical force on the sample surface was performed by using the measurement probe having the structure shown in FIG. 10. The measured values of spring constant of the measurement probe for surface measurement in the lateral direction and the vertical direction were 2.3 N/m and 7.7 N/m, respectively.

Figure 13:
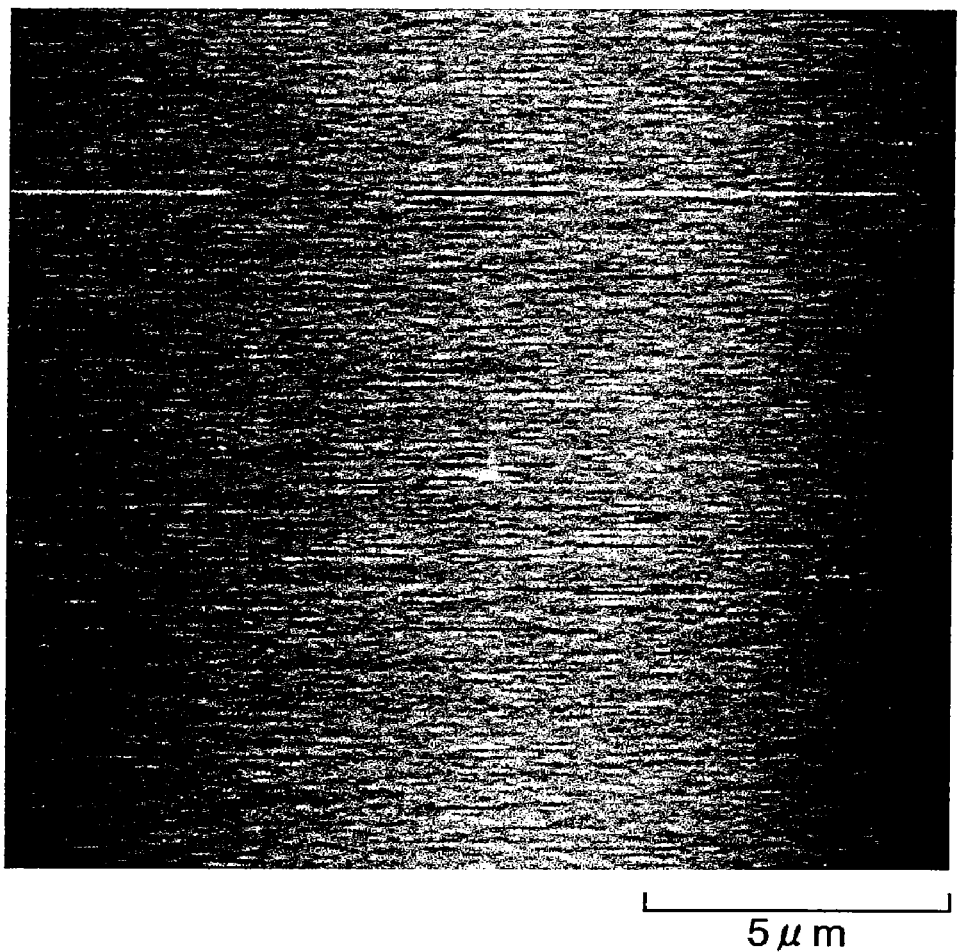
FIG. 13 shows an AFM image of a sample in terms of vertical force measured by the measurement probe shown in FIG. 10.
Figure 14:
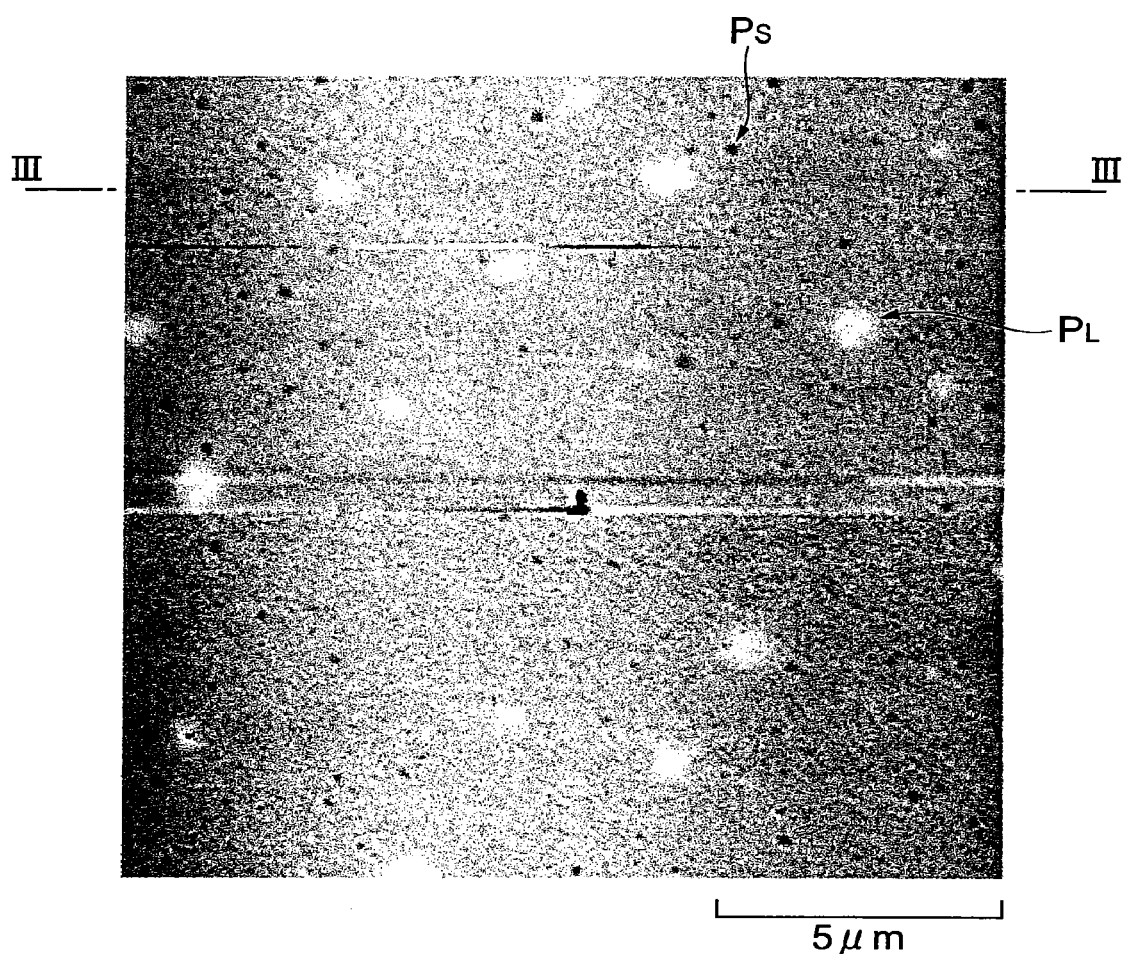
FIG. 14 shows an FFM image of a sample in terms of lateral force measured by the measurement probe shown in FIG. 10.
Figure 15:
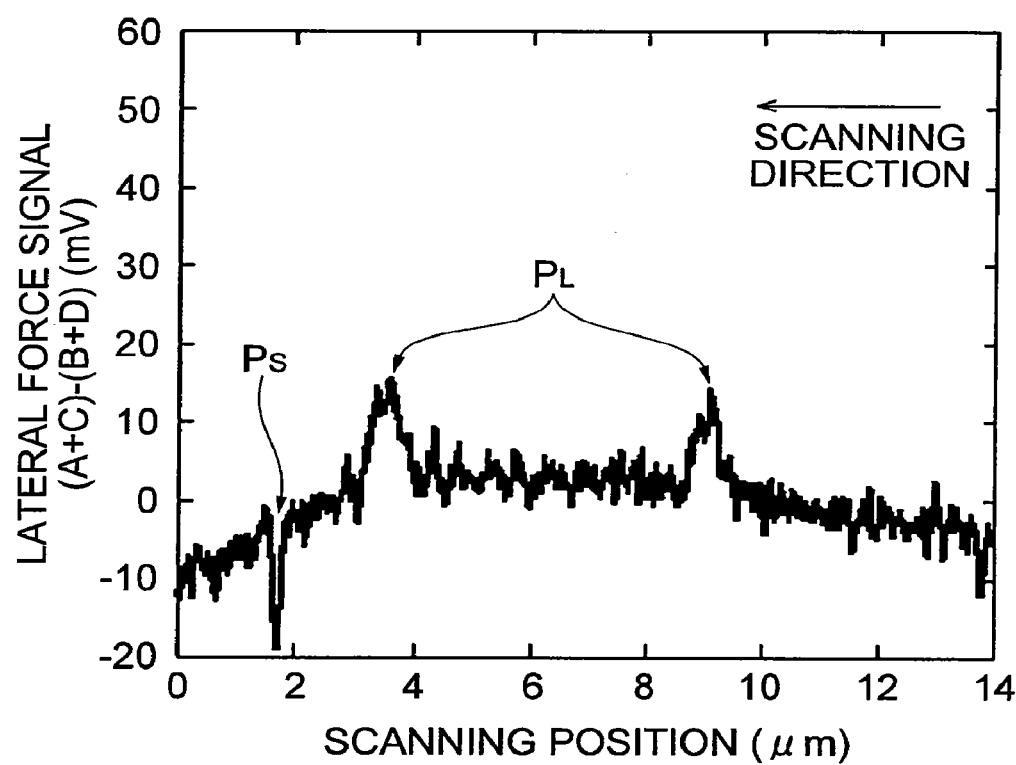
FIG. 15 is a graph showing III-III section of the FFM image shown in FIG. 14.

FIG. 13 shows an AFM image of a sample in terms of vertical force measured by the measurement probe shown in FIG. 10. FIG. 14 shows an FFM image of a sample in terms of lateral force measured by the measurement probe shown in FIG. 10. In the FFM image of FIG. 14, increased signal intensity and increased brightness of image give decreased friction force as the lateral force. FIG. 15 is a graph showing III-III section of the FFM image shown in FIG. 14.

As shown in FIG. 13, in the image of vertical force measurement on the sample by the contact mode AFM, very little fine structure is shown on the sample surface. On the other hand, in the image of lateral force measurement on the sample shown in FIGS. 14 and 15, a lateral force distribution image is obtained which shows that, on the surface of the lubrication film on the measurement sample, there are two kinds of granular structures of relatively large granular structure $P_L$ (approximately 0.7 μm in diameter), and small granular structure $P_S$ (approximately 0.2 μm in diameter).

These measurement results show that the measurement probe having above structure generates deformations in the lateral direction and the vertical direction in almost independent state from each other with very few interference therebetween, and shows that the independent measurement of lateral force and vertical force is available. Since the measurement is performed in a contact mode with a fixed load, the lateral force distribution shown in FIG. 14 is understood as corresponding to the distribution of friction coefficient.

Figure 16:
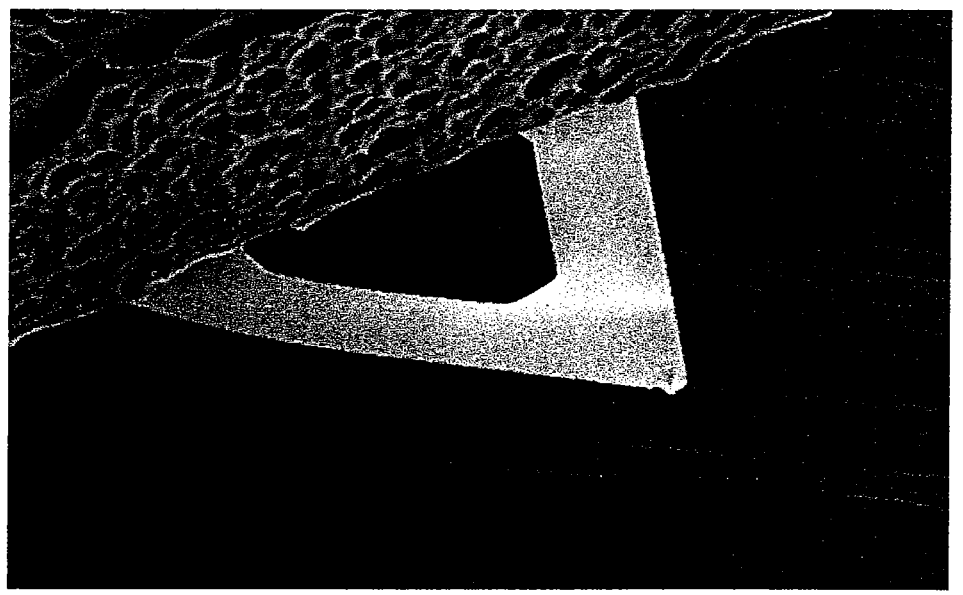
FIG. 16 is an SEM image showing a structure of a commercially available measurement probe.

For comparison, the above measurement sample was subjected to measurement of lateral force on the sample surface using a commercially available FFM measurement probe shown in the SEM image in FIG. 16. The spring constant of the FFM measurement probe used for surface measurement was about 200 N/m in the lateral direction.

Figure 17:
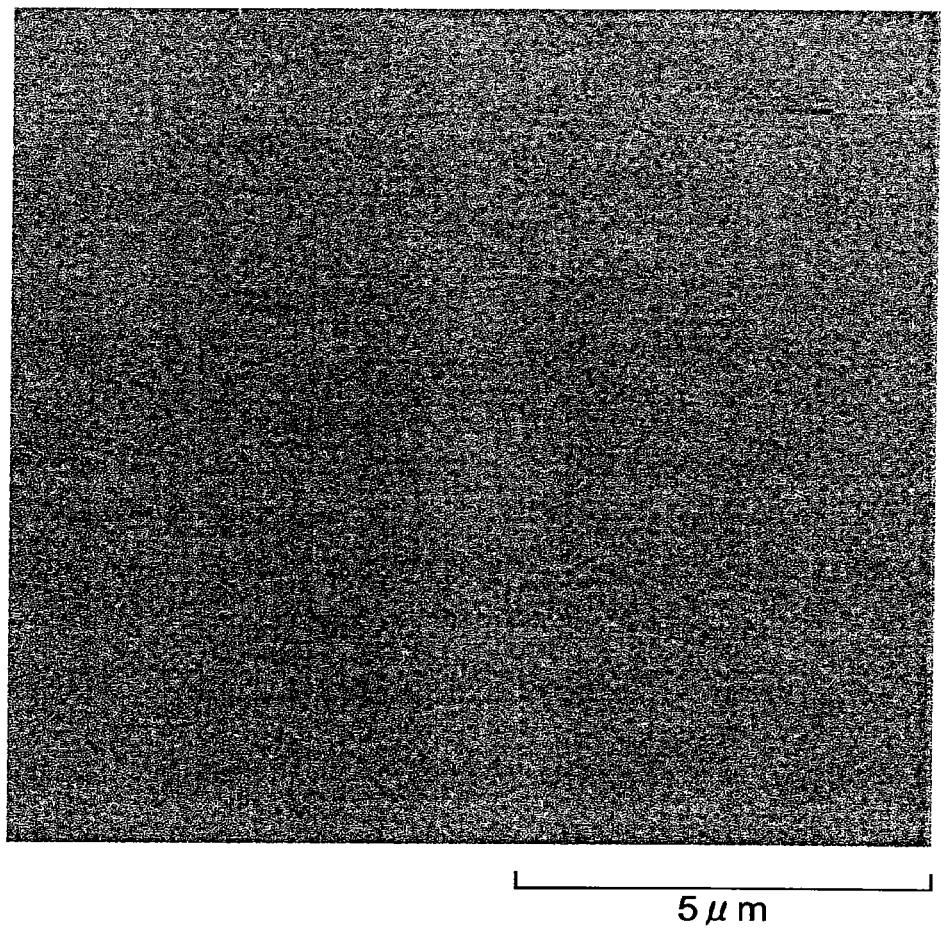
FIG. 17 shows an FFM image of a sample in terms of lateral force measured by the commercially available measurement probe.

FIG. 17 is an FFM image of a sample in terms of lateral force measured by the above-described commercially available FFM measurement probe. This image of lateral force measurement shows that no structure of granular structure and the like is observed on the surface of lubrication film on the measurement sample. To the contrary, the image of lateral force measurement shown in FIG. 14, obtained by using the measurement probe according to the present invention, two kinds of granular structures are clearly observed, as described above, of relatively large granular structure $P_L$, and small granular structure $P_S$. This result shows the superiority of the measurement probe having above structure.

Further discussion on a preferred structure of the measurement probe according to the present invention is given below. In the measurement probe 1 having the structure shown in FIG. 2, as described above, for the configuration of the first spring structure section 20 used to measure the vertical force, it is preferable that the section includes the torsion beam positioned so as to extend in the direction of the lateral axis and allowing torsion deformation thereof while connecting the rest of the support structure section 15 with the base section 10.

By using the structure having the first spring structure section 20 with the torsion beams and the second spring structure section 25 with the parallel springs, the lateral force and the vertical force can be independently measured and controlled preferably, for example, compared with the structure of two-stage connection of the first and second spring structure sections both of which are configured by parallel leaf springs. Also with that structure, the design of measurement probe becomes simple, and the manufacturing process thereof becomes easy.

Furthermore, the structure using the torsion beams shortens the length of total measurement probe in the direction of support axis, as shown in FIG. 2. In this case, the resonance frequency of the measurement probe in the vertical direction can be increased. This is effective in, as described before, being very little affected by external vibration noise mainly with components in the low frequency range.

Figure 18:
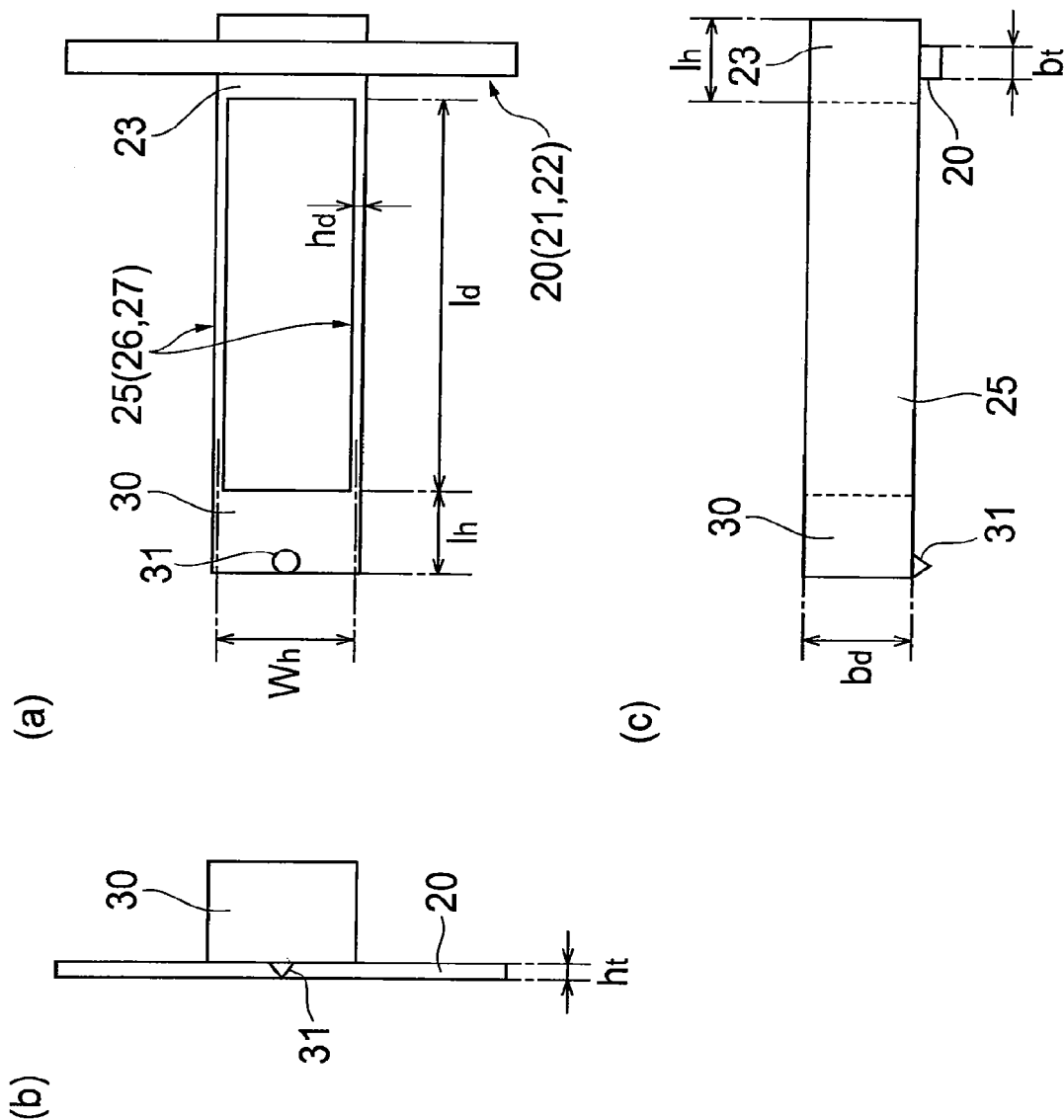
FIG. 18 shows an example of a configuration of the measurement probe.

For the effect of increasing the resonance frequency described above, calculations were performed by using a simplified model. Specifically, for the structure of the measurement probe given in schematic drawings of FIG. 18 with a bottom face view (a), front face view (b), and side face view (c), there were set, the length of the leaf springs 26 and 27 in the second spring structure section 25 as $l_d$=1200 μm, the width thereof as $b_d$=185 μm, the thickness thereof as $h_d$=5 μm, and the spacing of the parallel leaf springs as $w_h$=400 μm, and the length of the head section 30 and of the connection section 23 was set to $l_h$=300 μm.

With this structure, when the calculation is performed for the case that the first spring structure section 20 has the torsion beams having about 13 N/m of spring constant in the vertical direction, the approximate value of the resonance frequency in the vertical direction becomes 3 kHz. With a similar structure, when the calculation is performed for the case that also the first structure section 20 has the parallel leaf springs each having about 13 N/m of spring constant in the vertical direction, the approximate value of the resonance frequency in the vertical direction becomes 2 kHz. The calculation results suggest that the use of torsion beams in the first spring structure section 20 can increase the resonance frequency.

As for the first spring structure section 20, a structure other than the torsion beams such as parallel leaf springs can be adopted depending on the characteristics and conditions required to individual measurement probes. For the structure of torsion beams, in the structure shown in FIG. 18, a square rod structure having the same value for the width $b_t$ and the thickness $h_t$ ($b_t$=$h_t$), may be adopted. An example of this type of structure is the structure of $b_t$=$h_t$=20 μm as described above. Alternatively, the structure of torsion beams may be a structure of flat plate shape having the width $b_t$ larger than the thickness $h_t$ ($b_t$>$h_t$). An example of this type of structure is the one having $b_t$=70 μm and $h_t$=20 μm.

The measurement probe, the sample surface measuring apparatus, and the sample surface measuring method according to the present invention are not limited to those given in above embodiments and structural examples, and varieties of modifications can be applied. For example, as for the reflection pattern of the reflection surface provided on the head section, above structural examples adopt the pattern which contains the first reflection region extending in strip shape along the central axis in the direction of the support axis (first axis) of the support structure section, and the second reflection region having a reflectance different from that of the first reflection region, however, the reflection pattern can be different from above, such as a pattern in which the first reflection region is a rectangular shape region along the central axis.

In this case, the reflection surface of the head section is preferably formed with the reflection pattern which varies the reflectance in the direction of the lateral axis (second axis) within the surface. In general, it is preferable to adopt the reflection pattern allowing identifying the displacement by the photodetection device depending on the type of photodetection device (such as four-segment photodiode) used as the reflected light image detecting means. As for the method for forming reflection pattern on the reflection surface in the head section, varieties of methods can be applied. For example, in the case of forming a reflection pattern having the first and second reflection regions as given in the above structural example, the first reflection region can be formed by, other than the method to form thereof by a groove structure, forming an antireflection coating (AR coating) in a specific region on the reflection surface.

The measurement probe in the above embodiment is the one used for measuring the surface of the sample; and the measurement probe comprises: (1) a base section; (2) a head section having a probe tip for measuring the surface; and (3) a support structure section which supports the head section with the base section along a first axis as a support axis substantially orthogonal to a probe tip axis in the direction of protrusion of the probe tip, wherein (4) the support structure section includes two spring structure sections of a first spring structure section being structured deformable in the direction of the probe tip axis, and a second spring structure section being structured deformable in the direction of a second axis substantially orthogonal to the probe tip axis and the first axis, and wherein (5) the head section has a reflection surface which is provided at the side opposite to the probe tip and formed with a reflection pattern varying the reflectance within the surface.

For the detail structure of the support structure section, it is preferable that the first spring structure section includes a torsion beam positioned so as to extend in the direction of the second axis, and allowing torsion deformation thereof while connecting the rest of the support structure section with the base section. In addition, in this type of structure, it is particularly preferable that the base section has a pair of support sections being arranged to put the support structure section therebetween in the direction of the second axis, and the first spring structure section has a pair of torsion beams, as the above-described torsion beam, respectively connecting the rest of the support structure section with the pair of support sections. With the structure having the torsion beams, the torsion beams are twisted on the second axis (lateral axis) to deform themselves in the direction of the probe tip axis (vertical axis), thus functioning as the torsion springs, thereby displacing the head section in the direction of the vertical axis. As a result, the vertical force on the sample surface can be favorably measured.

It is also preferable that the second spring structure section has at least two leaf springs arranged in parallel with each other and facing the direction of the second axis. With the structure having the parallel leaf springs, the deformation of the leaf springs in the direction of the second axis (lateral axis) induces displacement of the head section in the direction of lateral axis. As a result, the lateral force on the sample surface is favorably measured.

Regarding the reflection pattern of the measurement light on the reflection surface of the head section, the reflection surface of the head section is preferably formed with the reflection pattern which varies the reflectance within the surface in the direction of the second axis. A preferred reflection pattern varying in the direction of the second axis is the reflection pattern which includes at least a first reflection region extending along a central axis in the direction of the first axis, and a second reflection region having a reflectance different from that of the first reflection region. That type of reflection pattern can favorably attain the measurement of deformation of the support structure section by the optical lever method and the measurement of vertical and lateral forces.

The sample surface measuring apparatus in the above embodiment has: (a) the above-described measurement probe for measuring the surface of the sample; (b) measurement light supplying means to supply measurement light for measuring a deformation of the support structure section in the measurement probe; (c) reflected light image detecting means to detect a reflected light image formed by the measurement light reflected by the reflection surface on the head section of the measurement probe; and (d) surface information processing means to acquire the surface information of the sample based on the result of detection of the reflected light image by the reflected light image detecting means, wherein (e) the reflected light image which is detected by the reflected light image detecting means is a two-dimensional light image formed by an irradiation pattern of the measurement light on the reflection surface and by the reflection pattern of the reflection surface, and wherein (f) the surface information processing means acquires both the surface information in the direction of the probe tip axis and the surface information in the direction of the second axis based on the result of detection of the reflected light image.

The sample surface measuring method in the above embodiment has: (a) by applying the above-described measurement probe for measuring the surface of the sample; (b) a measurement light supplying step of supplying a measurement light for measuring a deformation of the support structure section in the measurement probe; (c) a reflected light image detecting step of detecting a reflected light image formed by the measurement light reflected by the reflection surface of the head section of the measurement probe; and (d) a surface information processing step of acquiring the surface information of the sample based on the result of detection of the reflected light image in the reflected light image detecting step, wherein (e) the reflected light image which is detected in the reflected light image detecting step is a two-dimensional light image formed by an irradiation pattern of the measurement light on the reflection surface and by the reflection pattern of the reflection surface, and wherein (f) the surface information processing step acquires both the surface information in the direction of the probe tip axis and the surface information in the direction of the second axis based on the result of detection of the reflected light image.

The above-described sample surface measuring apparatus and the measuring method can acquire the surface information of the sample at high measurement accuracy without using special measuring system while using the measurement probe having the above structure and supplying measurement light to the measurement probe, thus to detect the reflected light image. In particular, by detecting the reflected light image of two-dimensional light image corresponding to the reflection pattern on the reflection surface formed on the head section of the measurement probe, a single measurement light beam can determine both the deformation in the direction of vertical axis at the first spring structure section and the deformation in the direction of lateral axis at the second spring structure section, and thus the surface information in both directions of vertical axis and lateral axis can be obtained with a simple structure.

For the sample surface measuring apparatus, it is preferable that the reflected light image detecting means has a segment type photodiode with at least four segments for detecting the reflected light image. Similarly for the sample surface measuring method, it is preferable that, in the reflected light image detecting step, the reflected light image is detected by using a segment type photodiode with at least four segments. By detecting the reflected light image using the segment type photodiode, both the deformation of the first spring structure section in the direction of the vertical axis and the deformation of the second spring structure section in the direction of the lateral axis can favorably be measured. A specifically preferable segment type photodiode is four-segment photodiode in view of the structure of photodiode and of simplification of the processing of detection signals output from the segment type photodiode.

When the segment type photodiode is used for detecting the reflected light image as described above, it is preferable that, for a plurality of photodetection segments of the segment type photodiode, the reflected light image is incident on the photodetection segments so that, with respect to a displacement direction of the reflected light image in the case that the measurement probe deforms in the direction of the probe tip axis, the reflected light image is detected by at least two photodetection segments, respectively, being arranged in the displacement direction. It is also preferable that, for a plurality of photodetection segments of the segment type photodiode, the reflected light image is incident on the photodetection segments so that, with respect to a displacement direction of the reflected light image in the case that the measurement probe deforms in the direction of the second axis, the reflected light image is detected by at least two photodetection segments, respectively, being arranged in the displacement direction. This type of structure is obtained by, for example, an adequate design of light-guide optical system which guides the reflected light image from the reflection surface of the measurement probe to the segment type photodiode.

For the measuring apparatus, it is preferable that the surface information processing means acquires the surface information referring to the variation of position of the reflected light image and to the variation of detection pattern of the reflected light within the reflected light image. Similarly for the measuring method, it is preferable that the surface information processing step acquires the surface information referring to the variation of position of the reflected light image and to the variation of detection pattern of the reflected light within the reflected light image. Specific methods for acquiring the surface information are preferably selected depending on the reflection pattern of the reflection surface formed on the head section of the measurement probe.

INDUSTRIAL APPLICABILITY

The present invention is applicable to the measurement probe which can improve the accuracy of measurement of sample surface without using special measuring system, to the sample surface measuring apparatus using the measurement probe, and to the sample surface measuring method.

The invention claimed is:

1. A measurement probe for measuring surface of a sample, comprising:
   a base section;
   a head section having a probe tip for measuring the surface; and
   a support structure section which supports the head section with the base section along a first axis as a support axis substantially orthogonal to a probe tip axis in the direction of protrusion of the probe tip,
   wherein the support structure section includes two spring structure sections of a first spring structure section which is deformable in the direction of the probe tip axis, and a second spring structure section which is deformable in the direction of a second axis substantially orthogonal to the probe tip axis and the first axis, and
   wherein the head section has a reflection surface which is provided at the side opposite to the probe tip and formed with a reflection pattern, varying the reflectance so as to include different reflectance values within the surface.

2. The measurement probe according to claim 1, wherein the first spring structure section includes a torsion beam positioned so as to extend in the direction of the second axis and allowing torsion deformation thereof while connecting the rest of the support structure section with the base section.

3. The measurement probe according to claim 2, wherein
   the base section has a pair of support sections being arranged to put the support structure section therebetween in the direction of the second axis, and
   the first spring structure section has a pair of torsion beams, as the torsion beam, respectively connecting the rest of the support structure section with the pair of support sections.

4. The measurement probe according to claim 1, wherein the second spring structure section has at least two leaf springs being arranged in parallel with each other and facing the direction of the second axis.

5. The measurement probe according to claim 1, wherein the reflection surface of the head section is formed with the reflection pattern which varies the reflectance within the surface in the direction of the second axis.

6. The measurement probe according to claim 1, wherein the reflection surface of the head section is formed with the reflection pattern which includes at least a first reflection region extending along a central axis in the direction of the first axis, and a second reflection region having a reflectance different from that of the first reflection region.

7. A sample surface measuring apparatus, comprising:
   the measurement probe according to claim 1, to measure surface of a sample;
   measurement light supplying means to supply measurement light for measuring a deformation of the support structure section in the measurement probe;
   reflected light image detecting means to detect a reflected light image formed by the measurement light reflected by the reflection surface of the head section of the measurement probe; and
   surface information processing means to acquire surface information of the sample based on the result of detection of the reflected light image by the reflected light image detecting means,
   wherein the reflected light image which is detected by the reflected light image detecting means is a two-dimensional light image formed by an irradiation pattern of the measurement light on the reflection surface and by the reflection pattern of the reflection surface, and
   wherein the surface information processing means acquires both the surface information in the direction of the probe tip axis and the surface information in the direction of the second axis based on the result of detection of the reflected light image.

8. The sample surface measuring apparatus according to claim 7, wherein the reflected light image detecting means has a segment type photodiode with at least four segments for detecting the reflected light image.

9. The sample surface measuring apparatus according to claim 8, wherein, for a plurality of photodetection segments of the segment type photodiode, the reflected light image is incident on the photo detection segments so that, with respect to a displacement direction of the reflected light image in the case that the measurement probe deforms in the direction of the probe tip axis, the reflected light image is detected respectively by at least two photodetection segments being arranged in the displacement direction.

10. The sample surface measuring apparatus according to claim 8, wherein, for a plurality of photodetection segments of the segment type photodiode, the reflected light image is incident on the photodetection segments so that, with respect to a displacement direction of the reflected light image in the case that the measurement probe deforms in the direction of the second axis, the reflected light image is detected respectively by at least two photodetection segments being arranged in the displacement direction.

11. The sample surface measuring apparatus according to claim 7, wherein, in the surface information processing means, the surface information is acquired by referring to the variation of position of the reflected light image and to the variation of detection pattern of the reflected light within the reflected light image.

12. A sample surface measuring method comprising:

a measurement light supplying step of, by applying the measurement probe for measuring surface of a sample according to claim 1, supplying a measurement light for measuring a deformation of the support structure section in the measurement probe;

a reflected light image detecting step of detecting a reflected light image formed by the measurement light reflected by the reflection surface of the head section of the measurement probe; and a surface information processing step of acquiring surface information of the sample based on the result of detection of the reflected light image in the reflected light image detecting step, wherein the reflected light image which is detected in the reflected light image detecting step is a two-dimensional light image formed by an irradiation pattern of the measurement light on the reflection surface and by the reflection pattern of the reflection surface, and wherein the surface information processing step acquires both the surface information in the direction of the probe tip axis and the surface information in the direction of the second axis based on the result of detection of the reflected light image.

13. The sample surface measuring method according to claim 12, wherein, in the reflected light image detecting step, the reflected light image is detected by using a segment type photodiode with at least four segments.

14. The sample surface measuring method according to claim 13, wherein, for a plurality of photodetection segments of the segment type photodiode, the reflected light image is incident on the photodetection segments so that, with respect to a displacement direction of the reflected light image in the case that the measurement probe deforms in the direction of the probe tip axis, the reflected light image is detected respectively by at least two photodetection segments being arranged in the displacement direction.

15. The sample surface measuring method according to claim 13, wherein, for a plurality of photo detection segments of the segment type photodiode, the reflected light image is incident on the photodetection segments so that, with respect to a displacement direction of the reflected light image in the case that the measurement probe deforms in the direction of the second axis, the reflected light image is detected respectively by at least two photo detection segments being arranged in the displacement direction.

16. The sample surface measuring method according to claim 12, wherein, in the surface information processing step, the surface information is acquired by referring to the variation of position of the reflected light image and to the variation of detection pattern of the reflected light within the reflected light image.

* * * * *